(12) United States Patent
Ono

(10) Patent No.: US 7,081,913 B2
(45) Date of Patent: Jul. 25, 2006

(54) IMAGE FORMING APPARATUS THAT PRINTS INPUT IMAGE OF 2/N TIMES PRINT RESOLUTION

(75) Inventor: Kenichi Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 315 days.

(21) Appl. No.: 10/725,470

(22) Filed: Dec. 3, 2003

(65) Prior Publication Data

US 2004/0160508 A1 Aug. 19, 2004

(30) Foreign Application Priority Data

Dec. 3, 2002 (JP) .............................. 2002-350820
Dec. 2, 2003 (JP) .............................. 2003-403255

(51) Int. Cl.
*B41J 2/47* (2006.01)
(52) U.S. Cl. ........................ 347/252; 347/240; 347/251
(58) Field of Classification Search ................ 347/240, 347/251–254, 131–132, 135, 142–144, 236–237, 347/246–247; 345/3.3–3.4, 698–699; 358/1.2, 358/3.07, 3.1, 443–444, 523–525; 382/299–300, 382/276–278, 382
See application file for complete search history.

(56) References Cited

U.S. PATENT DOCUMENTS

| | | | |
|---|---|---|---|
| 4,437,122 A | 3/1984 | Walsh et al. ................ | 348/625 |
| 4,575,769 A | 3/1986 | Arnoldi ....................... | 358/498 |
| 4,926,268 A * | 5/1990 | Kawamura et al. .......... | 358/3.1 |
| 5,610,651 A | 3/1997 | Yamakawa et al. | |
| 5,640,191 A | 6/1997 | Zulian et al. ................ | 347/247 |
| 5,926,616 A * | 7/1999 | Sato et al. .................... | 358/1.2 |
| 6,072,516 A | 6/2000 | Yamakawa ................... | 347/233 |
| 6,108,102 A | 8/2000 | Tanaka et al. ............... | 358/1.9 |
| 6,268,929 B1 | 7/2001 | Ono | |
| 6,356,290 B1 | 3/2002 | Taii ............................ | 347/130 |
| 6,587,137 B1 | 7/2003 | Shinohara et al. | |

FOREIGN PATENT DOCUMENTS

| | | |
|---|---|---|
| DE | 102 11 530 | 10/2003 |
| JP | 5-68162 | 3/1993 |
| JP | 7-266612 | 10/1995 |
| JP | 8-20129 | 1/1996 |
| JP | 8-108572 | 4/1996 |
| JP | 9-163138 | 6/1997 |
| JP | 2002-23087 | 1/2002 |
| WO | WO 98/43207 | 10/1998 |

OTHER PUBLICATIONS

U.S. Appl. No. 10/059,238, filed Jan. 31, 2002, Ono.

(Continued)

*Primary Examiner*—Hai Pham
(74) *Attorney, Agent, or Firm*—Oblon, Spivak, McClelland, Maier & Neustadt, P.C.

(57) ABSTRACT

An image forming apparatus is disclosed that includes a data buffer unit that buffers input binary data, the resolution of which is 2/n (n: an odd integer greater than or equal to 3) times a print resolution, a data transform unit that transforms the input binary data into output multi-level data of the print resolution, and a light beam modulation unit that modulates radiant energy of a light beam in accordance with the output multi-level data. Accordingly, an image of the print resolution printed by the image forming apparatus based on the input binary data looks as if the resolution of the image is that of the input binary data.

32 Claims, 23 Drawing Sheets

OTHER PUBLICATIONS

U.S. Appl. No. 10/665,536, filed Sep. 22, 2003, Motoyama.

U.S. Appl. No. 10/725,470, filed Dec. 3, 2003, Ono.

* cited by examiner

400dpi    MAIN 400 DPI X SUB 600 DPI

| INPUT BINARY DATA AB | POSITION INFORMATION | OUTPUT MULTI-LEVEL DATA (PWM DUTY) |
|---|---|---|
| ∫ | ∫ | ∫ |
| 10 | a<br>b<br>c | 100%<br>50%<br>0% |
| ∫ | ∫ | ∫ |

| INPUT BINARY DATA ABCD | POSITION INFORMATION | OUTPUT MULTI-LEVEL DATA (PWM DUTY) | PHASE |
|---|---|---|---|
| ⌇ | ⌇ | ⌇ | ⌇ |
| 1110 | a<br>b<br>c<br>d<br>e<br>f<br>g<br>h<br>i | 100%<br>100%<br>100%<br>0%<br>100%<br>100%<br>75%<br>50%<br>50% | —<br>—<br>—<br>—<br>—<br>—<br>-1<br>0<br>-1 |
| ⌇ | ⌇ | ⌇ | ⌇ |

FIG.28
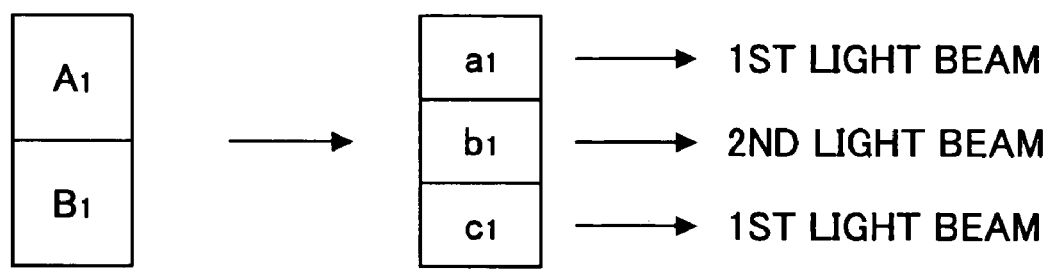
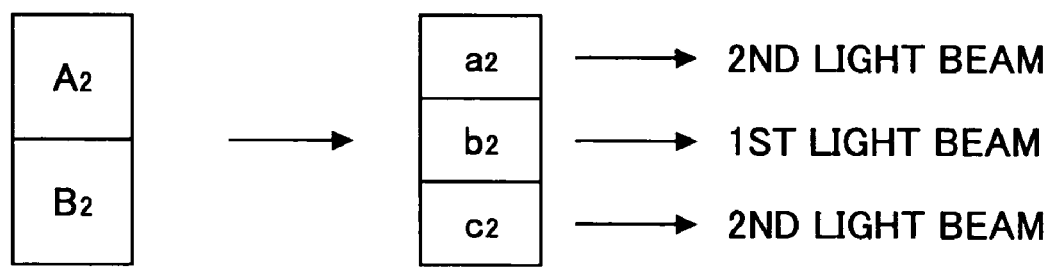

FIG.29
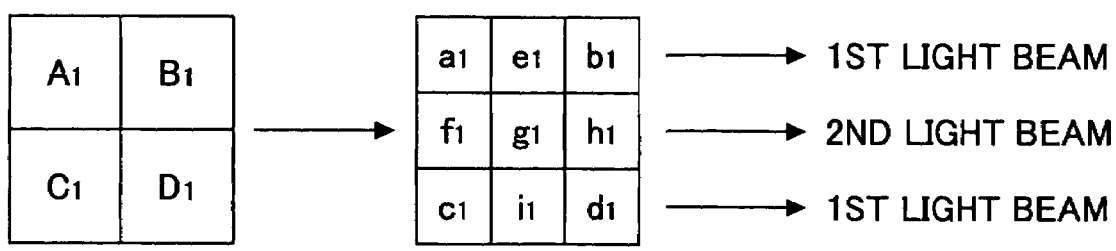
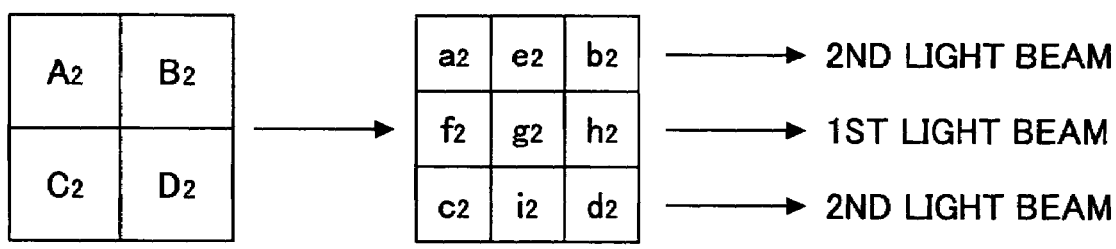

IMAGE FORMING APPARATUS THAT PRINTS INPUT IMAGE OF 2/N TIMES PRINT RESOLUTION

BACKGROUND OF THE INVENTION

1. Field of the Invention

The present invention generally relates to an image forming apparatus, and more particularly, to an image forming apparatus such as a laser printer and an LED printer that can print images at a print resolution, wherein the resolution of input image data is lower than the print resolution.

2. Description of the Related Art

The print resolution of an image forming apparatus (a laser printer and an LED printer, for example) is typically 600 dpi or 1200 dpi, where the print resolution is the resolution of images that the image forming apparatus can print on paper, for example. The image forming apparatus, however, needs to handle input image data of which resolution is lower than its print resolution. For example, when the image forming apparatus prints a facsimile message, the image forming apparatus needs to handle input image data of about 400 dpi, or 16 lines/mm. That is, the image forming apparatus needs to print 600 dpi images based on 400 dpi input image data without enlargement. The image forming apparatus may need to print 600 dpi images based on 200 or 240 dpi input image data too.

Japanese Patent Laid-Open Application No. 8-108572 discloses a laser printer that can accept multiple-resolution input image data. The laser printer adjusts the resolution in the main scan directions by changing a pixel clock determined by a PLL frequency synthesizer, for example, and adjusts the resolution in the sub scan directions by changing the process linear speed and/or the rotative speed of a polygon motor.

If the print resolution (600 dpi, for example) is an integer multiple of the resolution of input image data (200 dpi, for example), the same input image data may be repeated for multiple times.

Japanese Patent Laid-Open Application No. 2002-23087 discloses a multi-beam laser printer that adjusts resolution in the sub scan directions by changing beam pitch in the sub scan directions.

Japanese Patent Laid-Open Application No. 5-58162 discloses a printer that print 300 dpi images based on 200 dpi input image data by repeating every other dot of the input image data.

If the resolution of the input image data (input resolution) is 400 dpi while the print resolution the image forming apparatus is 600 dpi, that is the print resolution is not an integer multiple of the input resolution, the adjustment of resolution may be made by changing the pixel clock, the process linear speed, the rotation of the polygon motor, or the beam pitch (if multi-beam). The adjustment of resolution may need additional elements and affect the cost of the image forming apparatus.

The changing of the pixel clock requires a PLL frequency synthesizer that is available as a discrete IC chip or a part of an ASIC. The cost of the PLL frequency synthesizer is relatively low. The changing of the pixel clock is effective only for adjusting the resolution in the main scan directions. The resolution in the sub scan directions cannot be adjusted by changing the pixel clock.

The process linear speed is the speed of transported paper and a photosensitive unit. If the process linear speed of a 600 dpi printer is increased up to 3/2 times its original process linear speed, for example, the printer may print 400 dpi images. However, it is not easy to increase the process linear speed of a printer since the printer is optimized at its original process linear speed.

The process linear speed may be reduced. If the process linear speed of a 600 dpi printer is reduced down to 3/4 times its original process linear speed, for example, the resolution in the sub scan directions becomes 800 dpi. If a 600 dpi printer is operated at 1/2 of its original process linear speed, the 600 dpi printer can print 1200 dpi images. If the same input image data are printed twice as described above, the image becomes 400 dpi in the sub scan directions. However, the print speed of the printer is also reduced and the performance of the printer is degraded in this case. The reduction of the process linear speed may be achieved by using a variable speed motor, changing process conditions, and adjusting laser power. The printer needs additional mechanisms for changing its process linear speed.

If the rotative speed of a polygon motor needs to be changed, a variable rotative speed polygon motor available in the market can satisfy the requirement. If the rotative speed of the polygon motor is reduced to 2/3 of its original rotative speed, the resolution in the sub scan directions becomes 2/3 of an original resolution. If the resolutions in both the main scan directions and the sub scan directions need to be reduced from 600 dpi to 400 dpi, the rotative speed of the polygon motor needs to be reduced to 2/3 times its original rotative speed, and the pixel clock needs to be reduced to 4/9 times (2/3 squared) its original frequency. This change is relatively easy, but it takes at least several seconds as switching time to change the rotative speed of the polygon motor. The switching time degrades the performance of the printer.

A multi-beam printer additionally requires a mechanism to switch the beam pitch, which incurs additional cost. It is known that the beam pitch is adjustable by rotating a laser unit.

According to the above consideration, it is recommended that the resolution be electronically adjusted by repeating every other dot of the input image data as described in Japanese Patent Laid-Open Application 5-68162. The drawback of this technique is that dot size corresponding to the same input image data oscillates every other dot. The oscillation of the dot size distorts printed images and degrades their quality.

SUMMARY OF THE INVENTION

Accordingly, it is a general object of the present invention to provide a novel and useful image forming apparatus in which one or more of the above problems are eliminated. Another and more specific object of the present invention is to provide an image forming apparatus that can print undistorted images in response to input of binary image data, the resolution of which in the sub scan directions is 2/n (n: an odd integer) times the print resolution, without changing the process linear speed and the polygon motor rotative speed, for example, and without degrading performance or requiring additional mechanisms.

Yet another object of the present invention is to provide an image forming apparatus that can print undistorted images in response to input of binary image data, the resolution of which in both the main scan directions and the sub scan directions is 2/n (n: an odd integer) times the print resolution, without changing the pixel clock, the process linear speed, and the polygon motor rotative speed, for example, and without degrading performance and requiring additional mechanism.

To achieve at least one of the above objects, according to an aspect of the present invention, an image forming apparatus includes:

a data buffer unit that buffers input binary data, the sub-scan resolution of which is 2/n (n: an odd integer equal to or greater than 3) times a sub-scan print resolution;

a data transform unit that transforms the input binary data into output multi-level data of the sub-scan print resolution; and a light beam modulation unit that modulates radiant energy of a light beam in accordance with the output multi-level data.

According to the above arrangement, the input binary data of which resolution in the sub scan directions is 2/n times the print resolution in the sub scan directions are transformed into the output multi-level data, and the radiant energy of the light beam is modulated based on the output multi-level data. The image forming apparatus can print an image that looks as if its resolution is that of the input binary data without mechanically changing the process linear speed or the rotational speed of the polygon motor, for example.

According to another aspect of the present invention, an image forming apparatus may include:

a data buffer unit that buffers input binary data, the sub-scan resolution of which is 2/n (n: an odd integer equal to or greater than 3) times a sub-scan print resolution;

a data transform unit that transforms the input binary data into output multi-level data of the sub-scan print resolution;

a plurality of light sources that radiates light beams for scanning a photosensitive unit; and a plurality of light beam modulation units each of which modulates radiant energy of the light beam radiated by one of the light sources.

According to the above arrangement, the input binary data of which resolution in the sub scan directions is 2/n times the print resolution in the sub scan directions are transformed into the output multi-level data, and the radiant energy of the light beams is modulated based on the output multi-level data. The image forming apparatus can print an image that looks as if its resolution is that of the input binary data without mechanically changing the process linear speed or the rotation speed of the polygon motor, for example.

Other objects, features, and advantages of the present invention will become more apparent from the following detailed description when read in conjunction with the accompanying drawings.

BRIEF DESCRIPTION OF THE DRAWINGS

FIG. 28 is a schematic diagram for explaining a data transform of a multi-beam printer according to a fifth embodiment; and FIG. 29 is another schematic diagram for explaining a data transform of a multi-beam printer according to the fifth embodiment.

DETAILED DESCRIPTION OF THE PREFERRED EMBODIMENTS

A first embodiment of the present invention is described below in detail with reference to FIG. 1 through FIG. 10.

An image forming apparatus according to the first embodiment is, for example, a one-beam laser printer of which print resolution is 600 dpi. Binary input image data of which resolution in the sub scan directions (sub scan resolution) is 400 dpi are input to the laser printer. The resolution of the input image data in the main scan directions (main scan resolution) is assumed to be adjusted by changing the pixel clock from a pixel clock corresponding to 400 dpi to that corresponding to 600 dpi as described above referring to Japanese Patent Laid-Open Application No. 8-108572.

Figure 1:
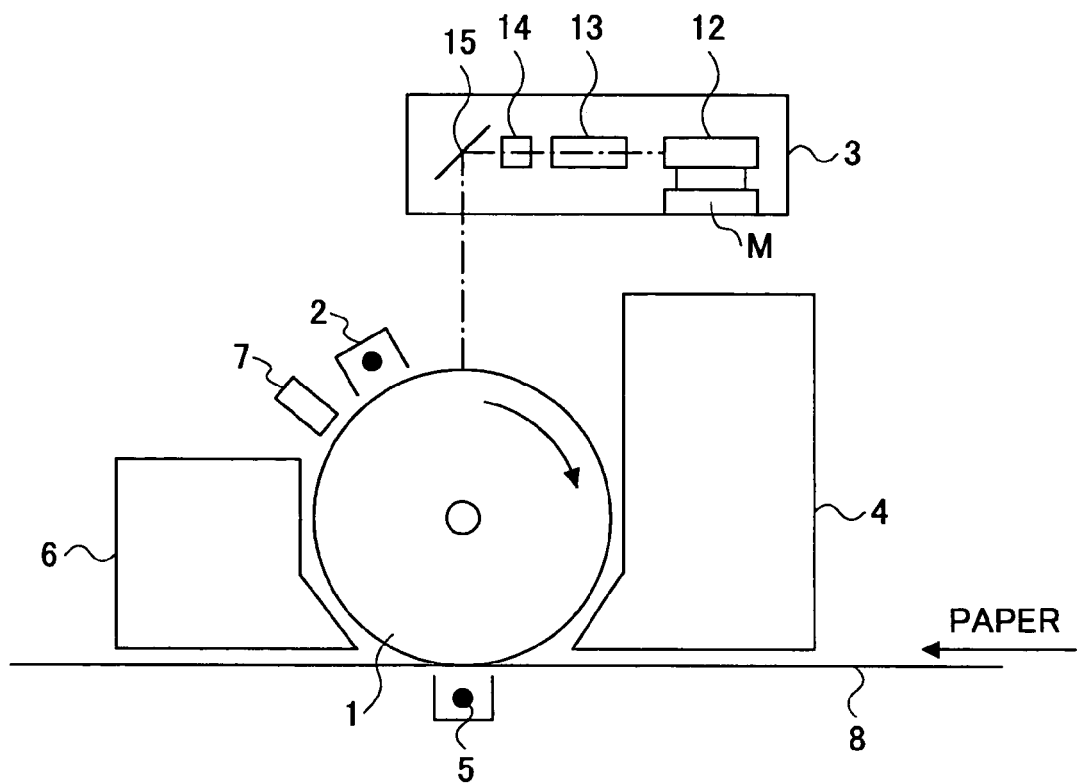
FIG. 1 is a schematic diagram showing the structure of a laser printer according to a first embodiment.

FIG. 1 is a schematic diagram showing the structure of the laser printer according to the first embodiment. The laser printer includes a drum-shaped photosensitive unit 1 and, around the photosensitive unit 1, a charger 2, a write unit 3, a development unit 4, a transfer unit 5, a cleaning unit 6, and a discharge unit 7. These units correspond to charging, exposing, developing, transferring, and cleaning processes, respectively, of a electrophotography process. An image is printed on paper 8, and is fixed by a fixing unit (not shown).

Figure 2:
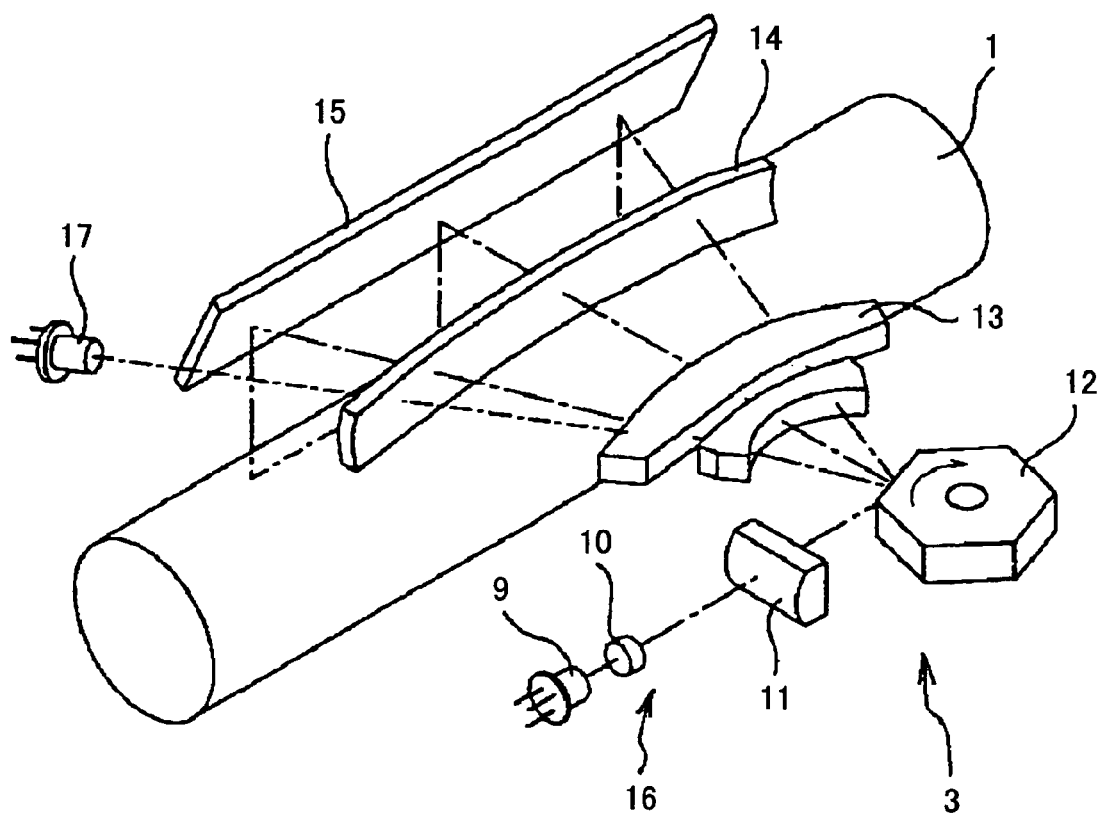
FIG. 2 is a schematic diagram showing the structure of a write unit according to the first embodiment.

FIG. 2 is a schematic diagram showing the structure of the write unit 3. The write unit 3 includes a semiconductor laser (LD) 9, a collimator lens 10, a cylinder lens 11, a polygon mirror 12 rotated by a polygon motor M (see FIG. 1), an f-theta lens 13, a Barrel Toroidal Lens (BTL) 14, and a mirror 15. A laser beam radiated by the LD 9 is modulated based on the input image data. The laser beam is made parallel by the collimator lens 10, travels through the cylinder lens 11, and is deflected in the main scan directions by the polygon mirror 12. The deflected laser beam travels through the f-theta lens 13 and the BTL 14, is reflected by the mirror 15, and scans the surface of the photosensitive unit 1. The BTL 14 focuses the laser beam in the sub scan directions and compensates for the optical face angle error of the polygon mirror 12. The above method of printing images is referred to as a raster scanning method.

The LD 9 and the collimator lens 10 form a monolithic LD unit 16. For example, the polygon mirror 12 is hexagonal-shaped and has 6 reflective surfaces. The polygon mirror is rotated by the polygon motor M (see FIG. 1) at a high rotative speed and deflects the laser beam in the horizontal plane. The polygon mirror 12 and the polygon motor M form a deflecting unit.

The write unit 3 further includes a sync detect sensor 17 at a predefined position in the main scan directions as shown in FIG. 2. Specifically, the sync detect sensor 17 is located in the horizontal plane in which the laser beam is deflected, but is located out of a range in which the laser beam is modulated in accordance with the input image data. Before the deflected laser beam scans the surface of the photosensitive unit 1, the sync detect sensor 17 receives the deflected laser beam and outputs a sync signal indicating the beginning of a scan.

Figure 3:
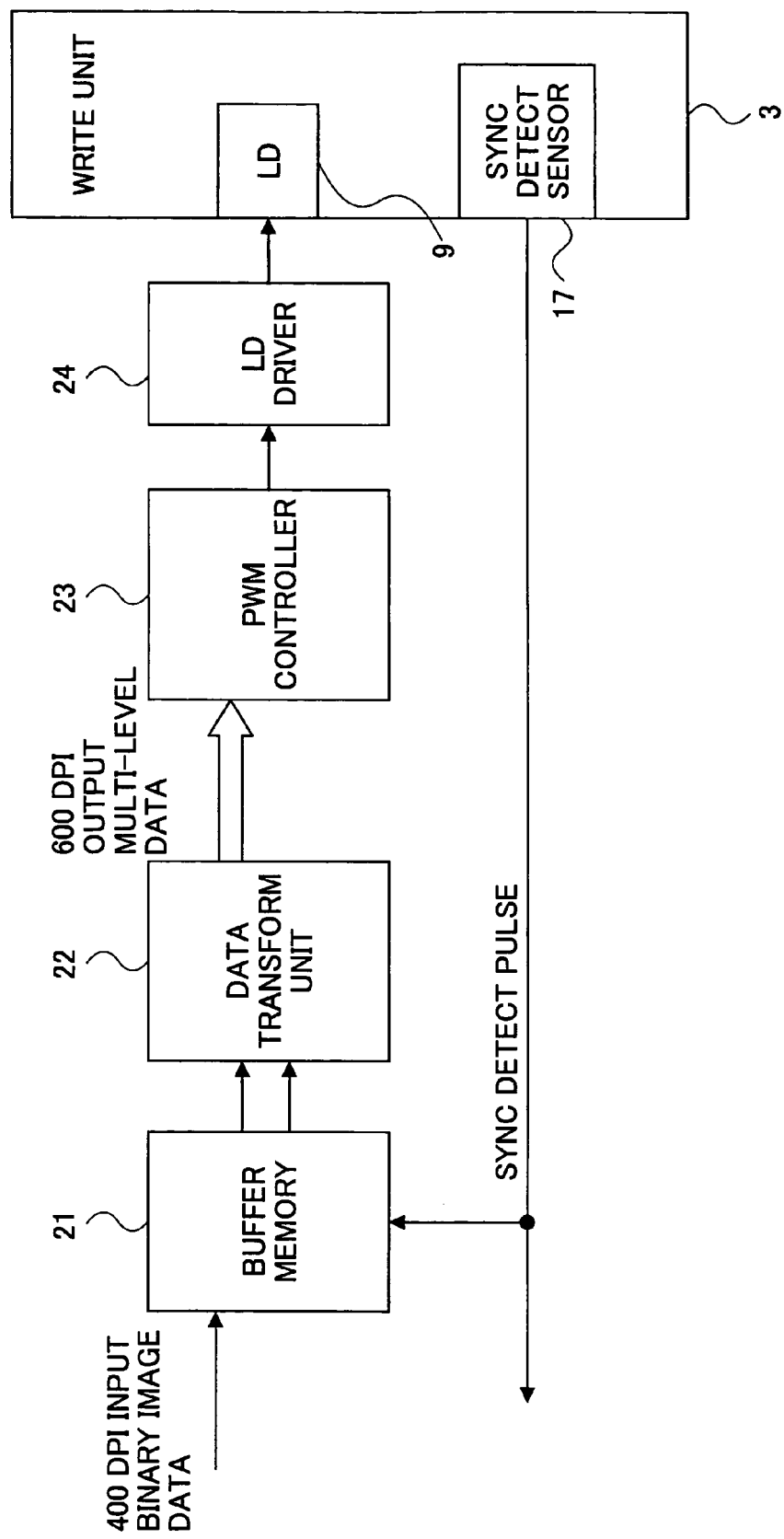
FIG. 3 is a block diagram showing an image write controller according to the first embodiment.

FIG. 3 is a block diagram showing an image write controller that controls the write unit 3. The image write controller includes a buffer memory 21 that is a data input unit. The buffer memory 21 buffers binary image data of which sub scan resolution is 400 dpi from a personal computer (PC). The buffer memory 21 temporarily stores the 400 dpi binary image data line by line. The stored binary image data are read by two lines in synchronization with the pixel clock. The image write controller further includes a data transform unit 22 that transforms the binary image data for two lines into multi-level data of which print resolution is 600 dpi. The multi-level data are input to a PWM controller 23 that is a light beam modulation unit. The PWM controller 23 controls the width and position of the pulse of a light beam radiated by the LD 9. The LD 9 radiates the light beam in response to a pulse width signal output by the PWM controller 23 through an LD driver 24. The pulse width modulation is publicly known (see Japanese Patent Laid-Open Applications No. 7-266612 and No. 9-163138, for example).

The sync detect sensor (sync detector) 17 in the write unit 3 outputs a sync detect pulse per a line in synchronization with a line scan. The sync detect pulse is input to the buffer memory 21. Data are input to and output from the buffer memory 21 in synchronization with the sync detect pulse.

According to this embodiment, since the buffer memory 21 is toggled between an input state and an output state by two lines, the buffer memory 21 needs at least 4 lines. The buffer memory 21 is assumed to have 4 lines #0 through #3. The buffer memory 21 equalizes data input speed of the 400 dpi input image data (binary image data) and data output speed of the 600 dpi multi-level data. The buffer memory 21 also provides a memory region in which a matrix for image processing is formed.

The binary image data of 400 dpi input resolution are input to the buffer memory 21 by the line as binary image data of 400 dpi sub scan resolution. The sub scan print resolution of the laser printer according to this embodiment is 600 dpi. While 3 lines of 600 dpi resolution are output from the buffer memory 12, 2 lines of 400 dpi binary image data are input to the buffer memory 12.

Figure 4:
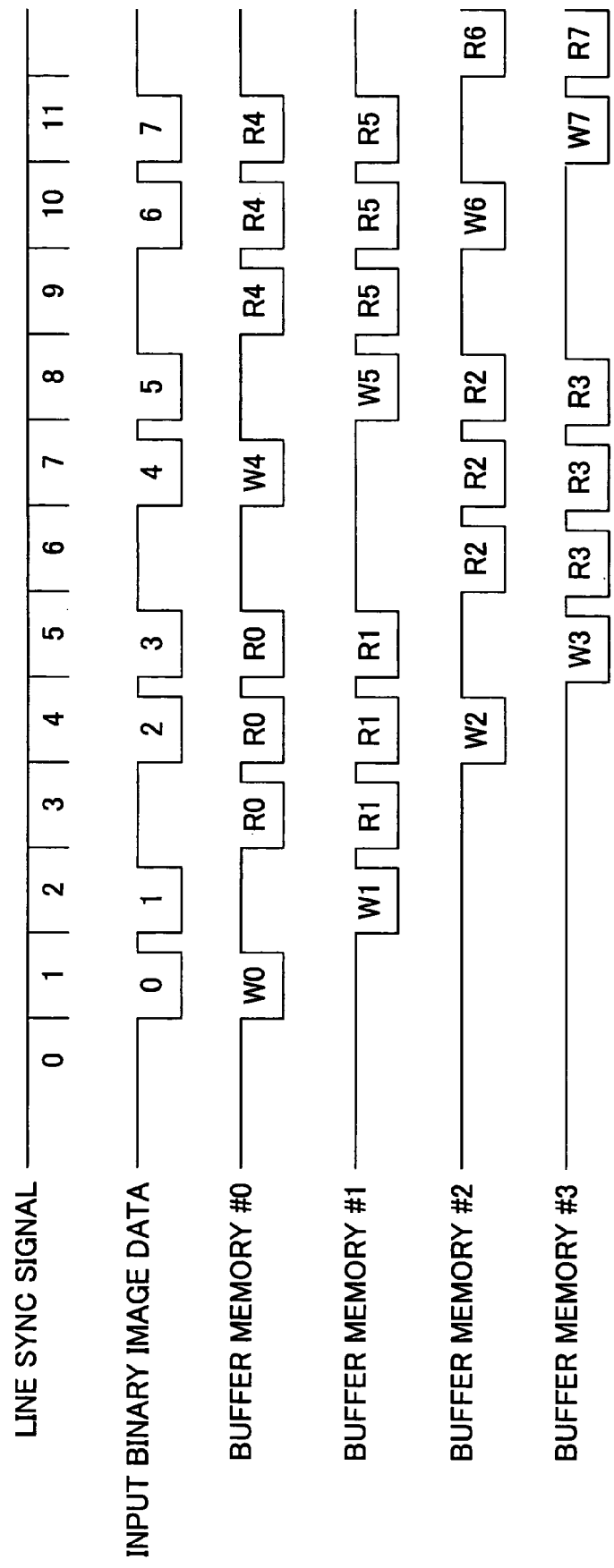
FIG. 4 is a timing diagram showing the writing and reading of data in a buffer memory according to the first embodiment.

FIG. 4 is a timing diagram showing writing and reading operations in the buffer memory 21.

A line sync signal is a signal generated based on the sync detect signal from the sync detect sensor 17. Each pulse of the line sync signal corresponds to the scanning of a main scan line. Each line sync signal is numbered from 0 to 11 as shown in FIG. 4 for the convenience of explanation below.

The binary image data (400 dpi sub scan resolution) of a scan line are transferred from the PC and input to the buffer memory 21 in the line sync signals. For example, the binary image data corresponding to the 0-th line (binary image data 0) are input to the buffer memory 21 (specifically, to the buffer memory #0) in the line sync signal 1. Then, the binary image data corresponding to the $1^{st}$ line (binary image data 1) are input to the buffer memory 21 (to the buffer memory #1) in the line sync signal 2. As described above, numerals in the binary image data shown in FIG. 4 denote the line number to which the binary image data correspond.

As described above, the binary image data 0 are written in the buffer memory #0 in synchronization with the line sync signal 1 (the writing of binary image data 0 is denoted as "W0"). Then, the binary image data 1 are written in the buffer memory #1 in synchronization with the line sync signal 2 (denoted as W1).

During the next three line sync signals 3–5, the binary image data W0 and W1 written in the buffer memory #0 and #1, respectively, are read simultaneously (the reading of binary image data 0 is denoted as R0, for example). The reading operation R0 and R1 are repeated for three line sync signals 3–5. It is noted that since no new data are written in the buffer memories #0 and #1, the same data are read three times.

In the line sync signal 4, binary image data 2 of the $2^{nd}$ line are written to the buffer memory #2 (denoted as W2). Then, in the line sync signal 5, binary image data 3 of the $3^{rd}$ line are written to the buffer memory #3 (denoted as W3).

It is noted that, while three lines of 600 dpi are scanned, only the binary image data for two scan lines are input to the buffer memory 12. According to this arrangement, while one line of 600 dpi is scanned, no binary image data are input to the buffer memory 12.

During the next three line sync signals 6–8, the binary image data W2 and W3 written in the buffer memory #2 and #3, respectively, are read simultaneously (denoted as R2 and R3). The reading operation R2 and R3 are repeated for three line sync signals 6–8. It is noted again that since no new data are written in the buffer memories #2 and #3, the same data are read three times.

In the line sync signal 7, binary image data 4 of the 4$^{th}$ line are written to the buffer memory #0 (denoted as W4). Then, in the line sync signal 8, binary image data 5 of the 5$^{th}$ line are written to the buffer memory #1 (denoted as W5).

According to the above arrangement, the buffer memory 21 keep outputting both the same binary image data of a first line and the same binary image data of a second line next to the first line for three line sync signals. For example, as described above, the buffer memory 21 outputs both the binary image data 0 and the binary image data 1 written in the buffer memory #0 and the buffer memory #1, respectively, during the line sync signals 3–5.

The binary image data output from the buffer memory 21 are input to the data transform unit 22. The data transform unit 22 processes two pixels (1 main scan pixel×2 sub scan lines) in a print clock cycle.

Figure 5:
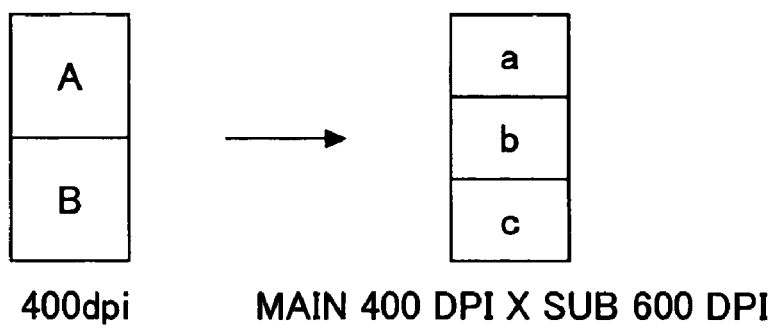
FIG. 5 is a schematic diagram for explaining data transform according to the first embodiment.

The data transformation performed by the data transform unit 22 according to the embodiment is described with reference to FIG. 5. In FIG. 5, a matrix (1 main scan pixel×2 sub scan lines) on the left side (input side) indicates input image data of 400 dpi main scan resolution and 400 dpi sub scan resolution. A matrix (1 main scan pixel×3 sub scan lines) on the right side (output side) indicates image data of 400 dpi main scan resolution and 600 dpi sub scan resolution after data transformation.

Three lines are scanned based on the input image data of 2 lines. Datum "a" of the 1$^{st}$ line at the output side is a multi-level datum corresponding to datum A, white (0) or black (1), of the 1$^{st}$ line at the input side. Datum "b" of the 3rd line at the output side is a multi-level datum corresponding to datum B of the 2$^{nd}$ line at the input side.

Datum "c" of the 2$^{nd}$ line at the output side is computed as follows. If both pixels A and B are black (1, 1), the datum c becomes the multi-level datum corresponding to black. If both pixels A and B are white (0, 0), the datum c becomes the multi-level datum corresponding to white. If one of pixel A or pixel B is white, and the other is black, the datum c becomes multi-level datum corresponding to a medium density.

Figure 6:
FIG. 6 is a schematic diagram for explaining the data transform from binary image data to pulse width modulation data according to the first embodiment.

FIG. 6 shows the data transformation to pulse width modulation (PWM) data in the case that the datum A is black and the datum B is white. The black portion in FIG. 6 indicates period in which the LD 9 is lit. According to FIG. 6, the LD 9 is fully lit based on the datum "a" of the 1$^{st}$ line, however, is lit at 50% duty based on the datum "c" of the 2$^{nd}$ line.

Figure 7:
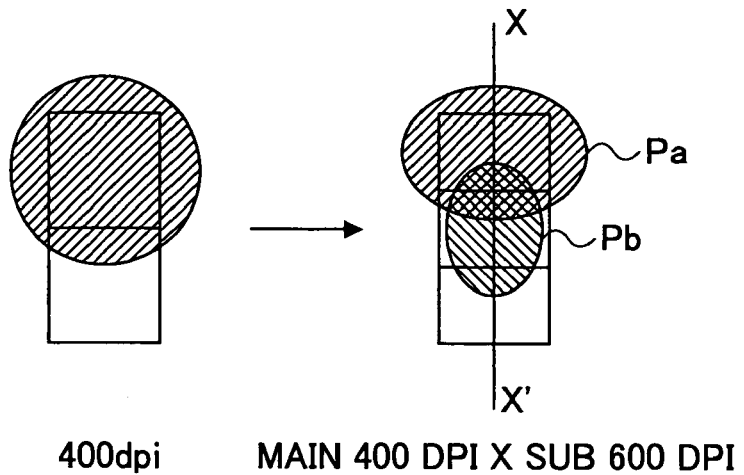
FIG. 7 is a schematic diagram showing latent images formed by the light beam pattern shown in FIG. 6.

FIG. 7 is a schematic diagram showing dot latent images formed by the LD 9 lit in accordance with the pattern (the pulse width) shown in FIG. 6. The dot latent image formed by a light beam Pa corresponding to the multi-level data "a" and the dot latent image formed by a light beam Pb corresponding to the multi-level data "b" are shown in the right side of FIG. 7.

Figure 8:
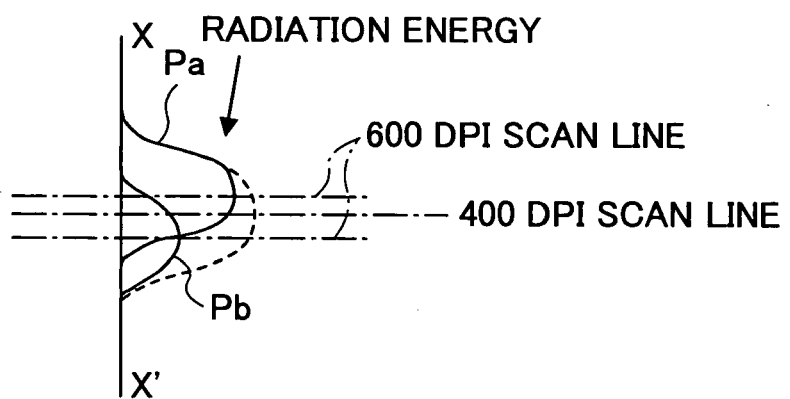
FIG. 8 is a schematic diagram showing the distribution of radiant energy according to an embodiment.

FIG. 8 is a schematic diagram showing the distribution of radiant energy of the light beams Pa and Pb along a straight line X–X'. A broken line indicates the radiant energy of an imaginary light beam in which the light beams Pa and Pb are superposed. It is noted that, as shown in FIG. 8, the barycenter of the imaginary light beam in which the light beams Pa and Pb are superposed is shifted from the scan line of the light beam. Specifically, two light beams having a radiant energy ratio of 2-to-1, the two light beams being separated by a 600 dpi dot distance, are superposed, and the barycenter of the composite light beam is located on the scan line of 400 dpi (input resolution).

More specifically, if the radiant energy of the light beam Pb is adjusted to about 1/2 times the radiant energy of the light beam Pa, the composite light beam thereof forms a latent image (dot) of which barycenter is positioned on the 400 dpi scan line. The word "about 1/2 times" means that the ratio between the two light beams may need to be fine tuned to compensate for the difference in the performance of engines caused by the photosensitive unit 1 and the LD 9. Accordingly, the ratio may range between (1/2)±α, where α is the compensation factor determined by the fine tuning.

FIGS. 7 and 8 show the case in which the binary image data of the upper line is black (1) and that of the lower line is white (0). In the case in which the binary image data of the upper line is white and that of the lower line is black, the light beam scanning the lower line in the three scan lines and the light beam scanning the middle line in the three scan lines may be lit and superposed at an intensity ratio of 2-to-1.

Figure 9:
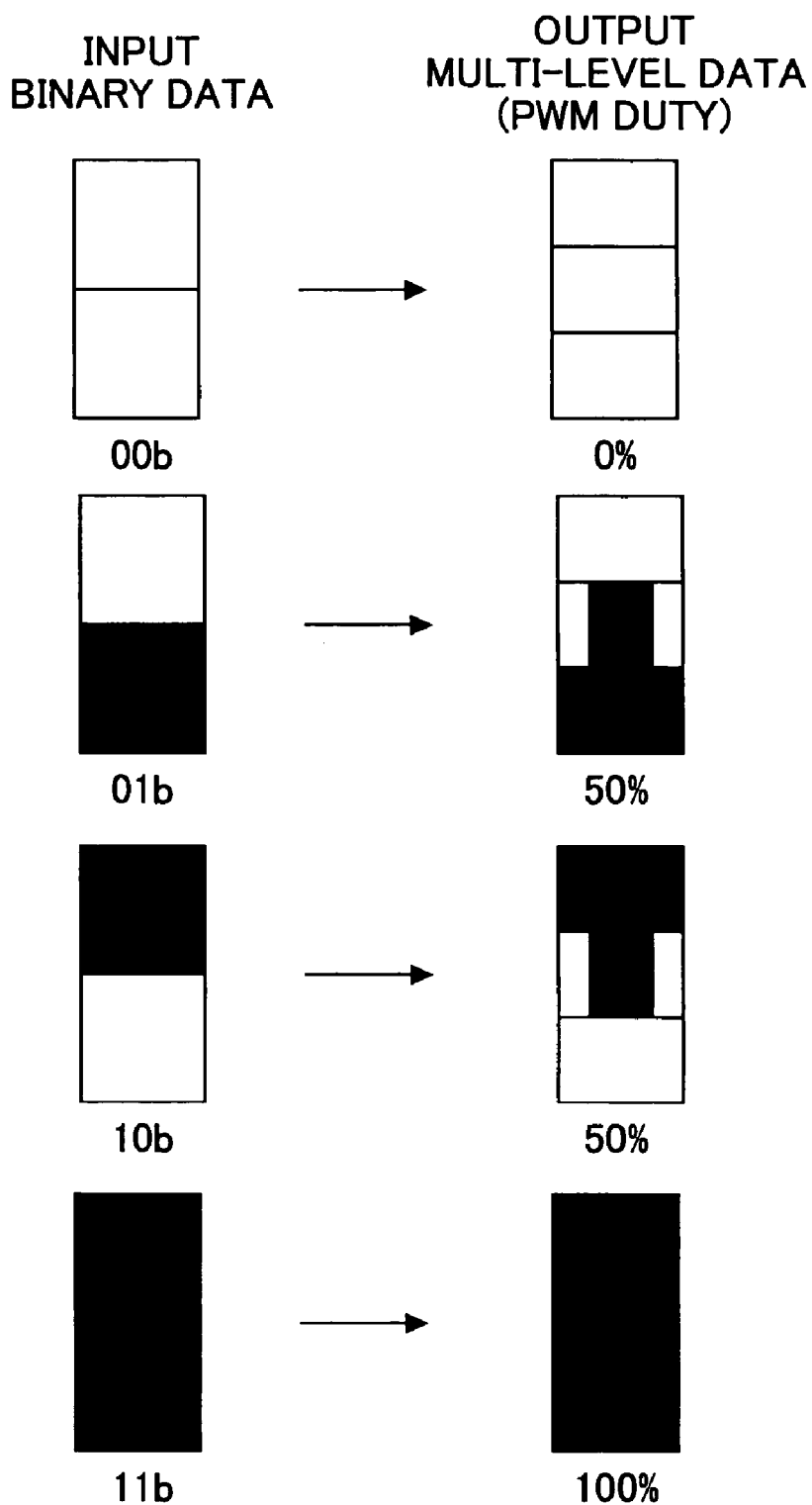
FIG. 9 is a schematic diagram showing the typical patterns of data transform according to an embodiment.

The transform unit 22 transforms 2 dots of the binary image data of 400 dpi input resolution (sub-scan resolution) (corresponding to A and B) into 3 dots of multi-level data of 600 dpi print resolution (corresponding to a, c, and b). FIG. 9 is a schematic diagram showing the transform.

When the input data AB=00, all output data (PWM duty) is 0% (a=b=c=0%). When the input data AB=01 or AB=10, the output data (PWM duty) is 50% (a=0%, b=100%, c=50%) or (a=100%, b=0%, c=50%). When the input data AB=11, all output data (PWM duty) is 100% (a=b=c=100%).

Figures 10A, 10B:
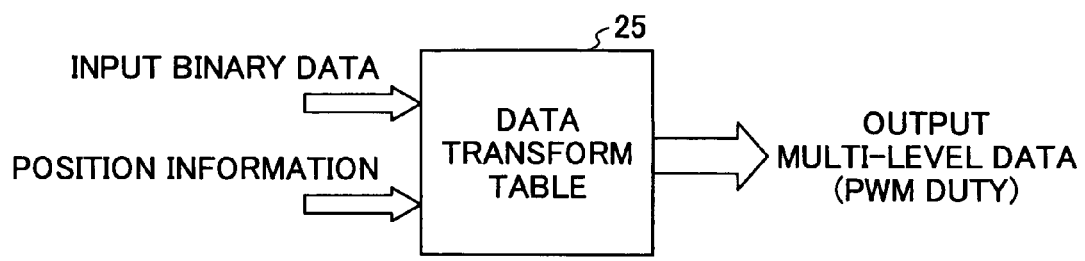
FIGS. 10A and 10B are schematic diagrams showing a data transform table according to an embodiment.

A data transform table 25 as shown in FIG. 10A may be used for transforming the data. Data (2 bits) of the two lines of 400 dpi and the position information (2 bits) designating one of the three scan lines of 600 dpi are input to the data transform table 25. The data transform table 25 outputs the PWM duty in response to the input.

Only the data of the middle scan line (among the three scan lines of 600 dpi) may be determined by the data transform table 25 in the following manner.

The multi-level data of the upper scan line and the lower scan line of 600 dpi are the "same" respective data of the two scan lines of 400 dpi. The "same" data means that, if the input binary data is 0, the output multi-level data is 0%, and if the input binary data is 1, the output multi-level data is 100%. In other words, the input binary data 1 corresponds to the output multi-level data of 100%, and the input binary data 0 corresponds to the output multi-level data of 0%. The multi-level data of the middle scan line of 600 dpi are determined based on the input data (2 bits) of the two scan lines of 400 dpi. Only the multi-level data of the middle scan line of 600 dpi need to be determined by the data transform table 25.

As shown in FIG. 9, when the input data (A, B) are (0, 1) or (1, 0), the multi-level data (PWM duty) of the middle scan line of 600 dpi is set at 50%. However, the actual radiant energy of the light beam is not necessarily exactly proportional to the nominal PWM duty due to noise in the PWM pattern. The multi-level data (PWM duty) may need to be adjusted so as to improve the 600 dpi image formed as a result of the above data transform. The data transform table 25 is useful in this case.

FIG. 10B illustrates an exemplary data transform table. It shows the case where the input data are 10*b* shown in FIG. 9, that is, when the binary image data (A, B)=(1, 0) and the position information "a, "b", and "c" are input, the output data (PWM duty) are 100%, 50%, and 0%, respectively.

The multi-level output data may be determined by computation instead of the data transform table 25. The multi-level data (PWM duty) "a", "b", and "c" can be computed as follows:

$$a = A,$$

$$b = B, \text{ and}$$

$$c = (A+B)/2.$$

That is, the output scan lines except for the middle scan line are divided into the upper scan line and the lower scan line. The output data "a" of the upper scan line are the "same" data as the input data A, and the output data "b" of the lower scan line are the "same" data as the input data B.

As explained above, the "same" data means that, if the input binary data is 0, the output multi-level data is 0%, and if the input binary data is 1, the output multi-level data is 100%. The output multi-level data "c" is determined based on the input binary data of 400 dpi.

A data adjustment table may be provided after the data transform unit 22 for tuning the output multi-level data (PWM data) so as to improve the 600 dpi image formed as a result of the above data transform.

According to the above arrangement, the data transform unit 22 can transform the input binary data of which sub scan resolution is 2/3 times the print resolution into the output multi-level data of the print resolution. The image forming apparatus can print the input image of 400 dpi sub scan resolution as an image of 600 dpi sub scan resolution in accordance with the output multi-level data. The printed image looks like an image of 400 dpi sub scan resolution. The print clock may need to be electrically changed, but the process linear speed and the rotational speed of the polygon motor M, for example, do not need to be mechanically changed.

According to the present embodiment, the pulse width modulation (PWM) method is used to modulate the radiant energy of the light beam radiated by the LD 9. According to another embodiment, the intensity of the light beam may be modulated. Both the pulse width and the intensity may be modulated. The modulation of the intensity and the modulation of both the pulse width and the intensity are known in the art (see Japanese Patent Laid-Open Application No. 7-266612 and No. 9-163138, for example).

Figure 11:
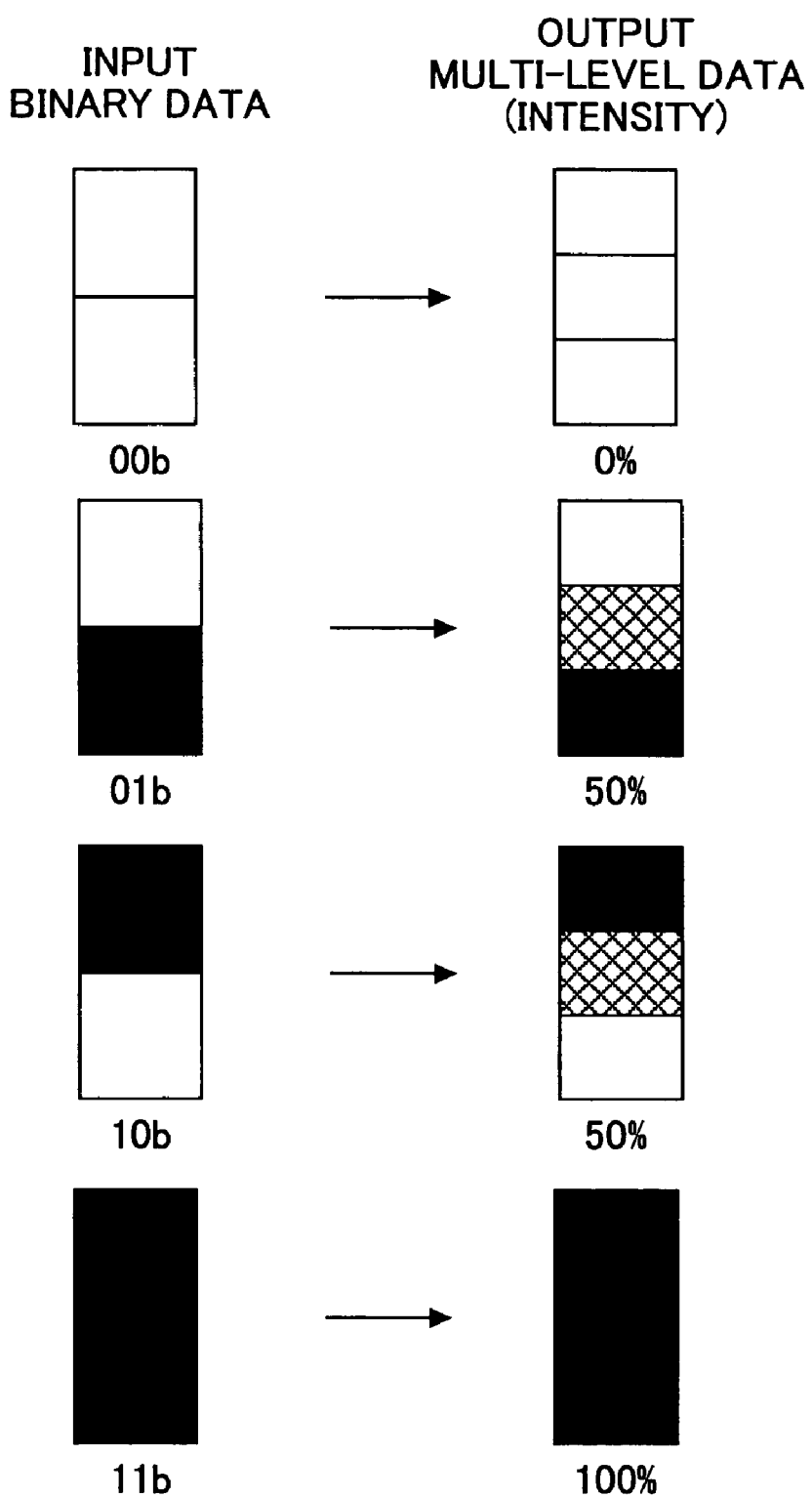
FIG. 11 is a schematic diagram showing the typical patterns of a data transform in which the intensity of light beam is modulated according to an embodiment.

FIG. 11 is a schematic diagram showing the intensity modulation method. When the input binary data (A, B) are (0, 0), the output multi-level data (a, b, c) are (0%, 0%, 0%). When the input binary data (A, B) are (0, 1) or (1, 0), the output multi-level data (a, b, c) are (0%, 50%, 100%) or (100%, 50%, 0%), respectively. The black portion indicates the output multi-level data of 100%, and the shaded portion indicates the output multi-level data of 50%. When the input binary data (A, B) are (1, 1), the output multi-level data (a, b, c) are (100%, 100%, 100%).

Since the beam diameter of the light beam radiated by the LD 9 is about 80 μm, the distribution of the radiant energy according to the intensity modulation is similar to that of the pulse width modulation shown in FIG. 8. As a result, it is possible to shift the barycenter of a latent image formed by two light beams having an intensity ratio of 2-to-1 distant from each other by 600 dpi distance (the distance of the print resolution), to the 400 dpi scan line (the input resolution).

An image forming apparatus according to a second embodiment of the present invention is described with reference to FIGS. 12 through 16. Portions identical to those of the image forming apparatus according to the first embodiment are referred to by the same numerals, and their description is omitted.

The image forming apparatus according to the second embodiment is a laser printer that can print images, both the main scan resolution and the sub scan resolution of which are 600 dpi, in response to receipt of input binary image data, both the main scan resolution and the sub scan resolution of which are 400 dpi. In the case of the laser printer according to the first embodiment, the print clock is lowered down to 400 dpi. In the case of the laser printer according to the second embodiment, the print clock is unchanged.

When the input binary image data are received, the buffer memory 21 operates in almost the same manner as the buffer memory 21 according to the first embodiment, but is different in that the same input binary image data of two pixels in the main scan directions are read for three cycles of the print clock.

The input binary image data of two scan lines are read simultaneously, and input to the data transform unit 22. The data transform unit 22 simultaneously processes 2 pixels (in the main scan line) times 2 sub scan lines, four pixels in total, in 3 cycles of the print clock.

Figure 12:
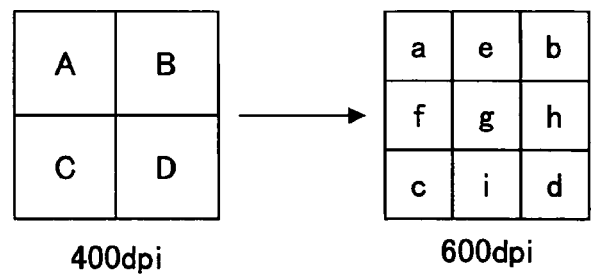
FIG. 12 is a schematic diagram for explaining a data transform according to a second embodiment.

The data transform performed by the data transform unit 22 according to the present embodiment is described with reference to FIG. 12. A 2×2 matrix (including 2 main scan pixels, 2 sub scan lines) indicating the 400 dpi input binary image data is shown at the left of FIG. 12, and a 3×3 matrix (including 3 main scan pixels, 3 sub scan lines) indicating the 600 dpi output multi-level image data is shown at the right of FIG. 12.

While 3 sub scan lines are printed, only the input binary image data of 2 sub scan lines are processed. The output multi-level data "a", "b", "c" and "d" are the "same" data as the input binary image data A, B, C, and D, respectively. The output multi-level data "e", "f", "g", "h", and "i" located on the middle column (a pixel array) and on the middle row (a scan line) are determined in the following manner.

The output multi-level data "e", for example, is determined by the input binary image data A and B. If the input binary image data (A, B) are (0, 0) or (1, 1), the output multi-level data "e" is 0% or 100%, respectively. If the input binary image data (A, B) are (0, 1) or (1, 0), then the output multi-level data "e" is 50%. If the position of 50% PWM pulse is adjustable, the 50% PWM pulse may be shifted toward the pixel "a" or "b" that is black (the output multi-level data is 100%). The output multi-level data "i" are determined in the same manner as "e" based on the input binary image data C and D.

The output multi-level data "f", for example, is determined based on the input binary image data A and C. If the input binary image data (A, C) are (0, 0) or (1, 1), the output multi-level data "f" is 0% or 100%, respectively. If the input binary image data (A, C) are (0, 1) or (1, 0), then the output multi-level data "f" is 50%. The output multi-level data "h" are determined in the same manner as "f" based on the input binary image data B and D.

The output multi-level data "g" is determined based on all input binary image data A, B, C, and D. If all the input binary image data A, B, C, and D are 0, the output multi-level data "g" is 0%. If one of the input binary image data A, B, C, and D are 1 and the other input binary image data are 0, the output multi-level data "g" is 25%. If two of the input binary image data A, B, C, and D are 1 and the other input binary image data are 0, the output multi-level data "g" is 50%. If three of the input binary image data A, B, C, and D are 1 and the other input binary image data are 0, the output multi-level data "g" is 75%. If all the input binary image data A, B, C, and D are 1, the output multi-level data "g" is 100%.

Figure 13:
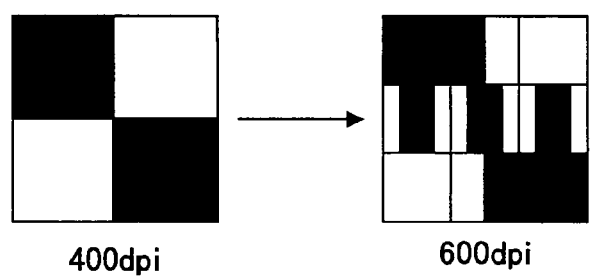
FIG. 13 is a schematic diagram showing the data transform into pulse width modulation according to an embodiment.

FIG. 13 shows the data transform from the 400 dpi input binary image data (A, B, C, D)=(1, 0, 1, 0) to the 600 dpi output multi-level data (PWM data). Black portions shown in FIG. 13 correspond to period in which the LD 9 is lit. As shown in FIG. 13, the output multi-level data "a" and "d" are 100%, the output multi-level data "e", "f", "g", "h", and "i" are 50%, and the output multi-level data "b" and "c" are 0%. It is noted that the 50% output multi-level data "e" is shifted toward the pixel "a" (the pixel corresponding to the output multi-level data "a") that is black, and that the 50% output multi-level data "i" is shifted toward the pixel "d" (the pixel corresponding to the output multi-level data "d") that is black.

Figure 14:
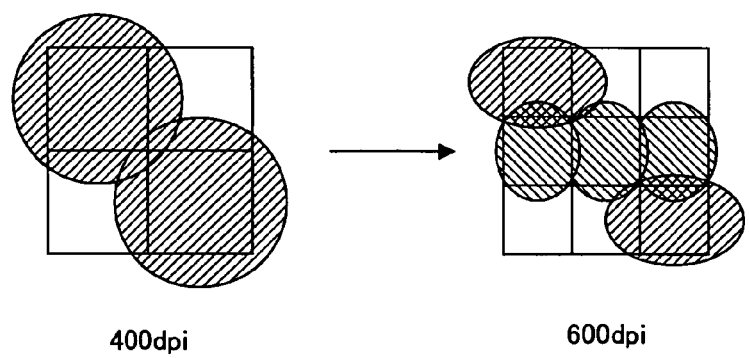
FIG. 14 is a schematic diagram showing latent images formed by the light beam pattern shown in FIG. 13.

FIG. 14 is a schematic diagram showing dot latent images formed by radiating the LD 9 in accordance with the PWM data shown in FIG. 13. As shown in FIG. 13, it is possible to shift the barycenter of the dot by superposing light beams of different radiant energy (pulse width), from the 600 dpi pixel array, 600 dpi (print resolution) sub scan line to the 400 dpi (input resolution) pixel array, 400 dpi sub scan line. If the 50% PWM pulse position is shifted in the main scan directions toward a pixel that is black (100% PWM duty), the quality of the image can be improved.

As described above, the data transform unit 22 according to the second embodiment can transform 2×2 pixels of the input binary image data, both the main scan resolution and sub scan resolution of which are 400 dpi, into 3×3 pixels of the output multi-level data, both the main scan resolution and sub scan resolution of which are 600 dpi.

Figure 15:
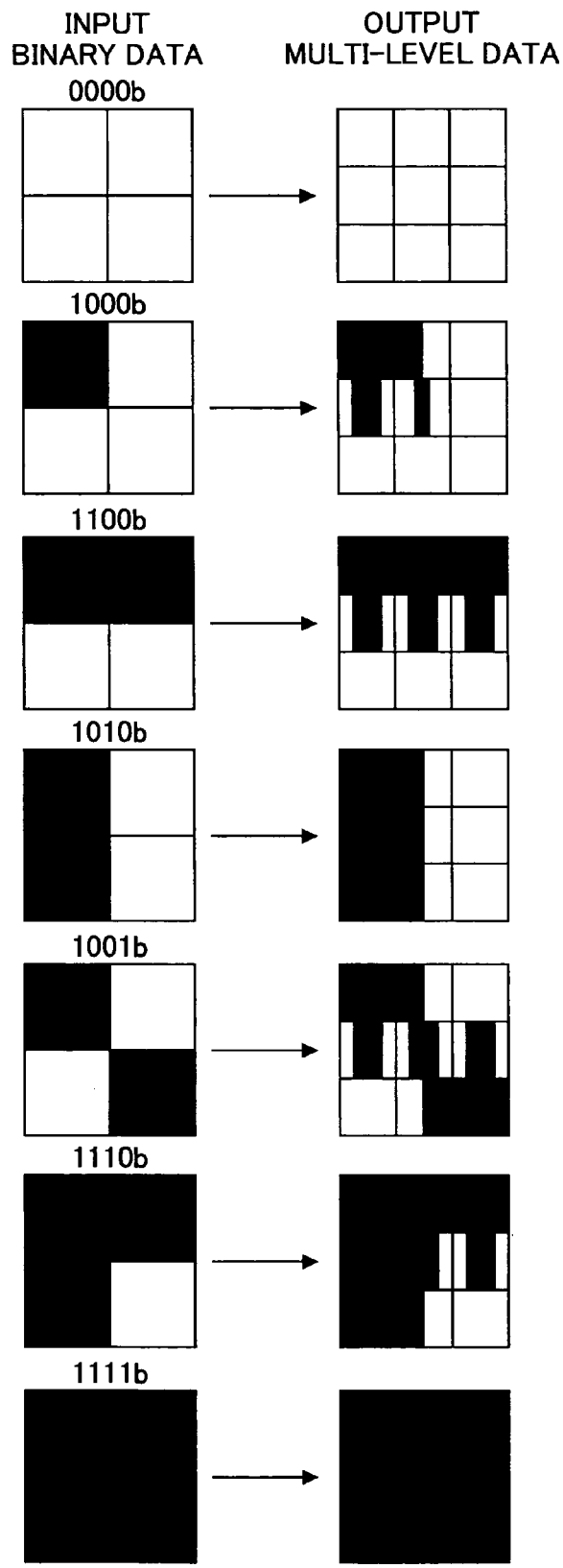
FIG. 15 is a schematic diagram showing the typical patterns of data transform according to an embodiment.

The typical patterns of the data transformation are shown in FIG. 15.

When the input binary image data (A, B, C, D) are (0, 0, 0, 0), all the output multi-level data are 0%.

When the input binary image data (A, B, C, D) are (1, 0, 0, 0), the output multi-level data "a" are 100%, and the output multi-level data "e" and "f" are 50%. The position of the output multi-level data "e" is shifted to the left. The output multi-level data "g" are 25%.

When the input binary image data (A, B, C, D) are (1, 1, 0, 0), the output multi-level data "a", "e", and "b" are 100%, and the output multi-level data "f", "g", and "h" are 50%.

When the input binary image data (A, B, C, D) are (1, 0, 1, 0), the output multi-level data "a", "f", and "c" are 100%, and the output multi-level data "e", "g", and "i" are 50%. The positions of the output multi-level data "e", "g", and "i" are shifted to the left.

When the input binary image data (A, B, C, D) are (1, 0, 0, 1), the output multi-level data "a" and "d" are 100%, and the output multi-level data "e", "f", "g", "h", and "i" are 50%. The position of the output multi-level data "e" is shifted to the left, and the position of the output multi-level data "i" is shifted to the right.

When the input binary image data (A, B, C, D) are (1, 1, 1, 0), the output multi-level data "a", "e", "b", "f", and "c" are 100%, and the output multi-level data "g" are 75%. The position of the output multi-level data "g" is shifted to the left. The output multi-level data "h" and "i" are 50%. The position of the output multi-level data "i" is shifted to the left.

When the input binary image data (A, B, C, D) are (1, 1, 1, 1), all the output multi-level data "a" through "i" are 100%.

Figures 16A, 16B:
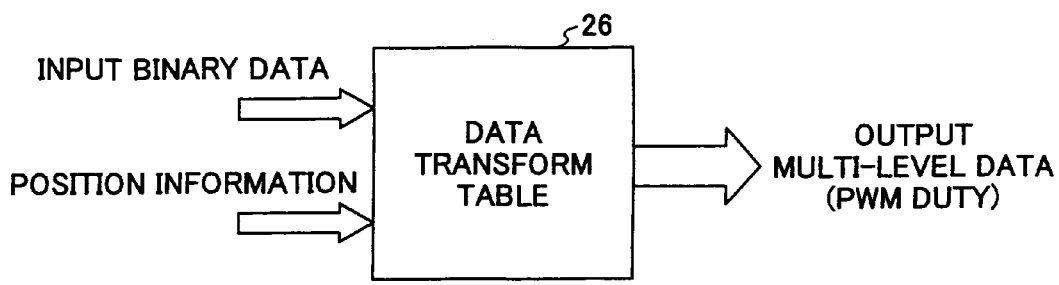
FIGS. 16A and 16B are schematic diagrams showing a data transform table according to an embodiment.

A data transform table 26 as shown in FIG. 16A may be used for transforming the data. Data (4 bits) of the two pixels (in the main scan direction) times two lines of 400 dpi and the position information (4 bits) designating one of the nine pixels in the 3×3 matrix are input to the data transform table 26. The data transform table 26 outputs the PWM duty in response to the input.

Alternatively, only the output multi-level data "e", "f", "g", "h", and "i" of the middle column and the middle scan line (among the nine scan lines of 600 dpi) may be determined by the data transform table 26 in the following manner.

The output multi-level data "a", "b", "c", and "d" are the "same" data as the input binary image data A, B, C, and D, respectively. The output multi-level data "e", "f", "g", "h", and "i" located on the middle column (a pixel array) and on the middle row (a scan line) are determined based on the position information thereof and the input binary image data A, B, C, and D (4 bits). Specifically, the output multi-level data "e" and "i" are determined based on the input binary image data (A, B) and (C, D), respectively. The output multi-level data "f" and "h" are determined based on the input binary image data (A, C) and (B, D), respectively. The output multi-level data "g" is determined based on all input binary image data A through D.

The input binary image data may be transformed in the following manner in front of the data transform table.

Each of the output multi-level data are first converted into 5 bit data. For example, the output multi-level data "a", "b", "c", and "d" located at the corner of the 3×3 matrix are set at either "00000" (00H) or "11111" (1FH) based on the input binary image data A, B, C, and D. The other output multi-level data "e", "i", "f", "h", and "g" are converted as follows:

output data "e" [5:0]=(A, B, 0, 0, 0),
output data "i" [5:0]=(C, D, 0, 0, 0),
output data "f" [5:0]=(A, C, 1, 0, 0),
output data "h" [5:0]=(B, D, 1, 0, 0), and
output data "g" [5:0]=(A, B, C, D, 1).

The lower 3 bits "0, 0, 0" of the output data "e", for example, indicate that the higher 2 bits "A, B" are data in a row (main scan direction). The lower 3 bits "1, 0, 0" of the output data "f", for example, indicate that the higher 2 bits "A, C" are data in a column (sub scan direction).

The above transformed input binary data are transformed into the PWM data by the data transform table 26.

FIG. 16B shows an exemplary data transform table. It shows the case where the input data are 1110*b* shown in FIG. 15, that is, when the binary image data (A, B, C, D)=(1, 1, 1, 0) and the position information "a" through "i" are input, the output data (PWM duty) are 100%, 100%, 100%, 0%, 100%, 100%, 75%, 50%, and 50%, respectively. Additionally, the phase data (the position of the PWM pulse) of the output multi-level data "g", "h", and "i" are −1 (shifted to the left), 0 (middle), and −1 (shifted to the left), respectively.

The output multi-level data may be computed in the following manner without using the data transform table 26.

The output multi-level data "a", "b", "c", and "d" at the four corners of the 3×3 matrix are computed: a=A, b=B, c=C, and d=D. That is, for example, if the input binary data A is 0, the output multi-level data "a" is determined as 0%, and if the input binary data A is 1, the output multi-level data "a" is determined as 100%.

The remaining output multi-level data "e" through "i" are determined as follows:

$e=(2A+2B)/4,$ $f=(2A+2C)/4,$ $g=(A+B+C+D)/4,$ $h=(2B+2D)/4$, and $i=(2C+2D)/4$.

The phase data indicating the position of PWM pulse are computed as follows:

$g=B+D-(A+C)$, $h=0$, and $i=D-C$,

If the result of the phase data computation is either −1 or −2, the PWM pulse is shifted to the left. If the result of the phase data computation is 0, the PWM pulse is positioned in the middle. If the result of the phase data computation is either +1 or +2, the PWM pulse is shifted to the right.

In the 3×3 matrix of the output multi-level data "a" through "i" formed by the adjacent 3 pixels in the adjacent 3 scan lines, the output multi-level data "a", "b", "c", "d" in sub-matrixes obtained by dividing the 3×3 matrix with the middle pixel array "e", "g", "i" and the middle scan line "f", "g", "h" (in this case, each sub-matrix includes only 1 element) are determined to be the "same" data as the input binary data A, B, C, D. The output multi-level data "e" and "i" of the middle pixel array are determined based on the input binary data (A, B) and (C, D), respectively. The output multi-level data "f" and "h" of the middle scan line are determined based on the input binary data (A, C) and (B, D), respectively. The output multi-level data "g" at the crossing point of the middle pixel array and the middle scan line is determined based on the input binary data A, B, C, D.

As described above, the data adjustment table may be provided between the data transform unit 22 and the PWM controller 23, and the output multi-level data may be adjusted thereby before input to the PWM controller so as to improve the image formed as a result of the data transform.

Accordingly, the data transform unit 22 can transform the input binary data of which resolution is 400 dpi both in the main scan directions and the sub scan directions, the resolution is 2/3 times the print resolution of 600 dpi, into the output multi-level data of which resolution is 600 dpi both in the main scan directions and the sub scan directions. The PWM controller 23 modulates the pulse width of the light beam radiated by the LD 9 based on the output multi-level data. In response to receipt of the input binary data, the laser printer according to the second embodiment can print an image of which resolution is 600 dpi both in the main scan directions and in the sub scan directions without changing its print resolution. The 600 dpi image of the input binary data looks as if the 600 dpi image is an image of which resolution is 400 dpi both in the main scan directions and in the sub scan directions. It is not necessary to electronically or mechanically change the print clock, the process linear speed, and/or the rotation speed of the polygon motor.

The laser printer according to the second embodiment uses the pulse width modulation (PWM) for modulating the radiant energy of the light beam radiated by the LD 9. According to another embodiment, the laser printer may modulate the intensity of the light beam, or both the pulse width and the intensity of the light beam. The modulation methods of the intensity of the light beam or both the pulse width and the intensity of the light beam are publicly known (see Japanese Patent Laid-Open Applications No. 7-266612 and No. 9-163138, for example).

Figure 17:
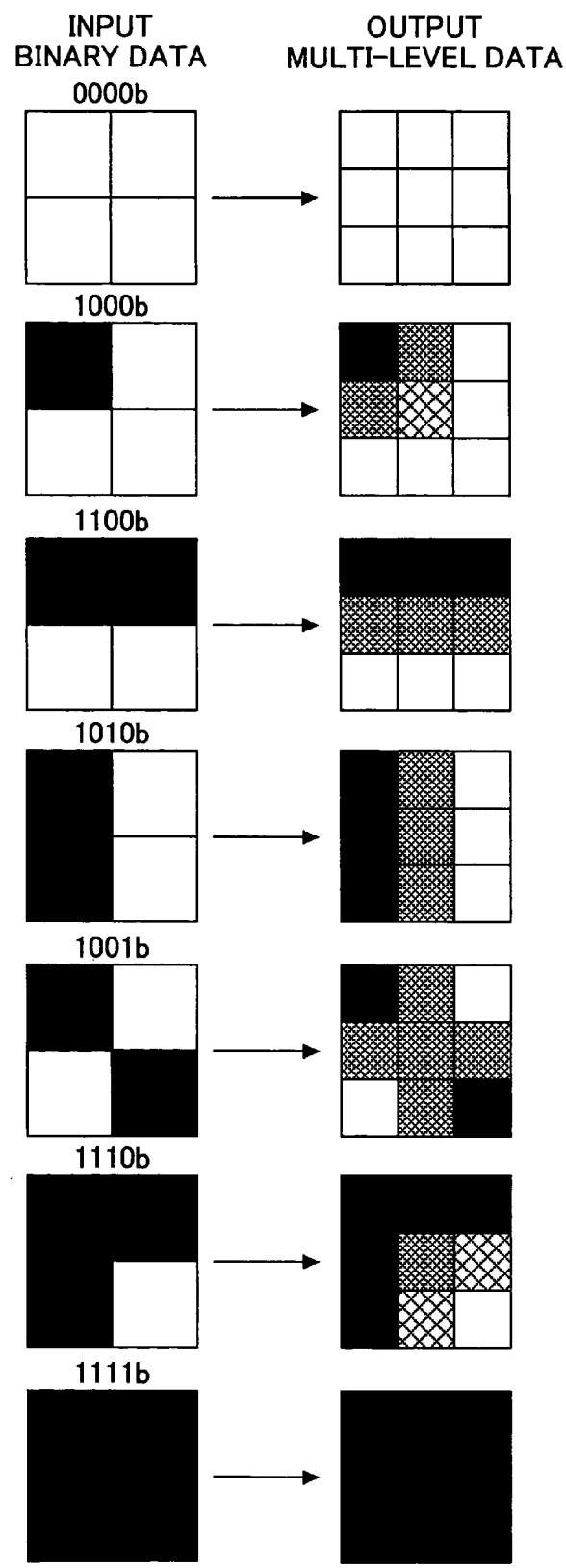
FIG. 17 is a schematic diagram showing the typical patterns of a data transform in which the intensity of light beam is modulated according to an embodiment.

FIG. 17 is a schematic diagram for explaining the modulation of the intensity.

When the input binary data A, B, C, D are "0", "0", "0", "0", all the output multi-level data "a" through "i" are 0%. When the input binary data A, B, C, D are "1", "0", "0", "0", the output multi-level data "a" is 100% (black), the output multi-level data "e", "f" are 50% (shaded), and the output multi-level data "g" is 25% (lightly shaded).

When the input binary data A, B, C, D are "1", "1", "0", "0", the output multi-level data "a", "e", "b" are 100% (black), the output multi-level data "f", "g", "h" are 50% (shaded). When the input binary data A, B, C, D are "1", "0", "1", "0", the output multi-level data "a", "f", "c" are 100% (black), the output multi-level data "e", "g", "i" are 50% (shaded).

When the input binary data A, B, C, D are "1", "0", "0", "1", the output multi-level data "a", "d" are 100% (black), and the output multi-level data "e", "f", "g", "h", "i" are 50% (shaded). When the input binary data A, B, C, D are "1", "1", "1", "0", the output multi-level data "a", "e", "b", "f", "c" are 100% (black), the output multi-level data "g" are 75% (shaded), and the output multi-level data "h", "i" are 50% (lightly shaded).

When the input binary data A, B, C, D are "1", "1", "1", "1", all the output multi-level data "a" through "i" are 100% (black).

A description of an image forming apparatus according to a third embodiment of the present invention is given below with reference to FIGS. 18 through 22. The image forming apparatus according to the third embodiment is a single beam laser printer, for example, that can print images of 600 dpi resolution in response to receipt of input binary data of 240 dpi resolution. It is assumed that the laser printer increases the resolution of the images in the main scan directions by adjusting the print clock (240/600=2/5 times), for example, using a well-known technique described in the above Japanese Patent Laid-Open Application No. 8-108572.

Figure 18:
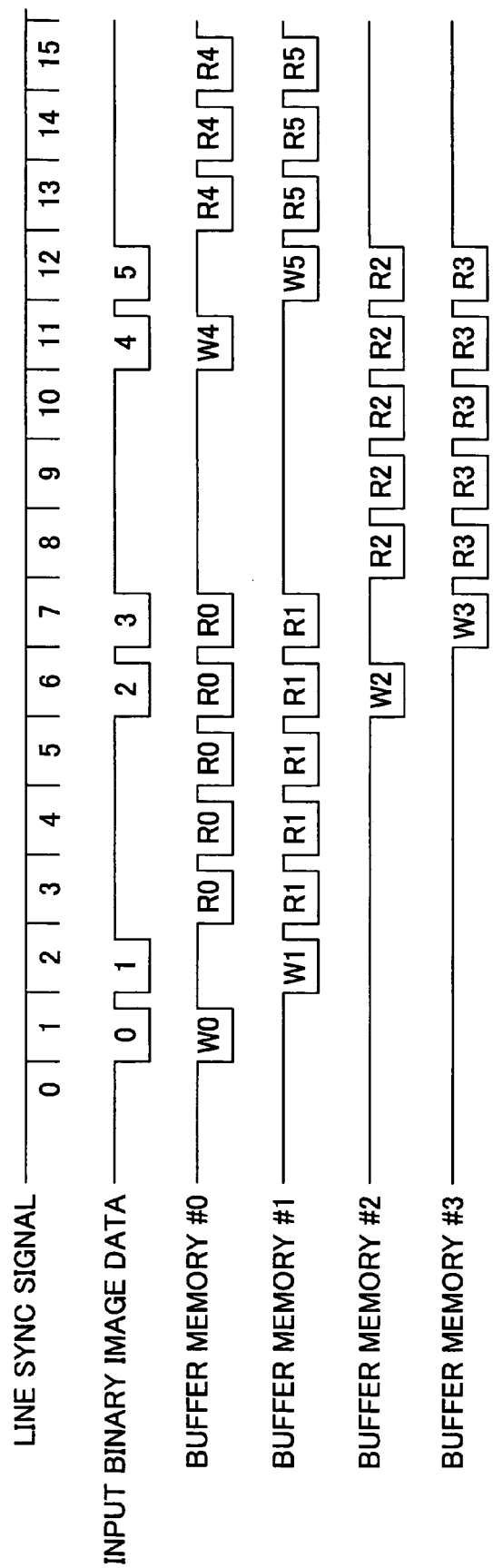
FIG. 18 is a timing diagram showing the writing and reading of data in a buffer memory according to a third embodiment.

FIG. 18 is a timing diagram showing the operation of the buffer memory 21 according to the present embodiment in which the input binary data are written and read. The line sync signal is generated based on the sync detect signal from the sync detect sensor 17. Each scan of a scan line triggers a pulse of the line sync signal. The input binary data of 240 dpi resolution of a scan line are input in each line sync signal cycle. While the laser printer scans 5 scan lines of 600 dpi resolution, the input binary data of 2 scan lines of 240 dpi need to be input to the laser printer. As a result, no input binary data are input to the laser printer in 3 line sync signal cycles.

In the timing diagram shown in FIG. 18, the cycles of the line sync signal are numbered for the convenience of description. The numerals in the input binary data indicate the scan lines thereof. In the line sync signal 1, the input binary data of the $0^{th}$ scan line are written in the buffer memory #0. The writing of the input binary data of the $0^{th}$ scan line in the buffer memory #0 is indicated as W0. In the line sync signal 2, the input binary data of the $1^{st}$ scan line are written in the buffer memory #1. The writing of the input binary data of the $1^{st}$ scan line in the buffer memory #1 is indicated as W1.

In five line sync signals 3 through 7, the input binary data of the $0^{th}$ scan line and the $1^{st}$ scan line are simultaneously read from the buffer memory #0 and the buffer memory #1, respectively. The reading of the input binary data from the buffer memories are indicated as R0 and R1. No input binary data are written to both the buffer memory #0 and the buffer memory #1 during the line sync signals 3 through 5. The same input binary data are output five times from the buffer memory #0 and the buffer memory #1.

In the line sync signal 6, the input binary data of the $2^{nd}$ scan line are written to the buffer memory #2. The writing of the input binary data of the $2^{nd}$ scan line to the buffer memory #2 is indicated as W2. In the line sync signal 7, the input binary data of the $3^{rd}$ scan line are written to the buffer memory #3. The writing of the input binary data of the $3^{rd}$ scan line to the buffer memory #3 is indicated as W3.

In the five line sync signals 8 through 12, the input binary data of the $2^{nd}$ scan line and the $3^{rd}$ scan line are simultaneously read from the buffer memory #2 and the buffer memory #3, respectively. The reading of the input binary data from the buffer memories are indicated as R2 and R3. No input binary data are written to both the buffer memory #2 and the buffer memory #3 during the line sync signals 8 through 10. The same input binary data are output five times from the buffer memory #2 and the buffer memory #3.

In the line sync signal 11, the input binary data of the $4^{th}$ scan line are written to the buffer memory #0. The writing of the input binary data of the $4^{th}$ scan line to the buffer memory #0 is indicated as W4.

According to the above arrangements, the same input binary data of 2 scan lines are output by the buffer memory 21 for five line sync signal cycles.

The input binary data of 2 adjacent scan lines in the sub scan directions are output from the buffer memory 21 and input to the data transform unit 22. The data transform unit 22 simultaneously processes 1 pixel in 2 scan lines (2 pixels in total).

Figure 19:
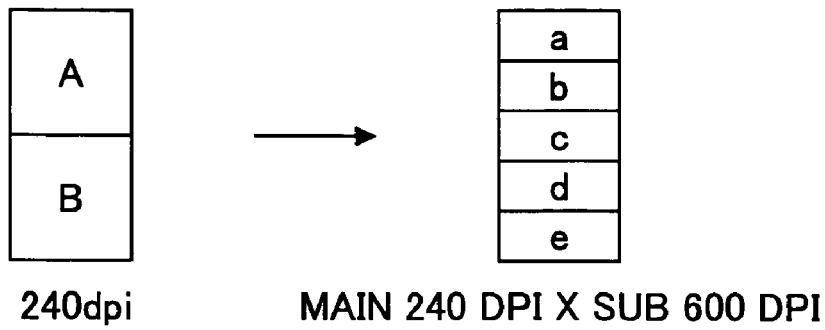
FIG. 19 is a schematic diagram for explaining data transform according to the third embodiment.

FIG. 19 is a schematic diagram showing the data transform performed by the data transform unit 22. In FIG. 19, a 2×1 matrix indicating the input binary data of 240 dpi resolution in both the main scan directions and the sub scan directions and a 5×1 matrix indicating the output multi-level data of 240 dpi resolution in the main scan directions and 600 dpi in the sub scan directions are shown at the left side and the right side.

Five scan lines are scanned based on the input binary data of 2 scan lines. The multi-level datum "a" of the $1^{st}$ scan line and the multi-level datum "b" of the $2^{nd}$ scan line are either 0% (when the input binary datum A is 0) or 100% (when the input binary datum A is 1). The multi-level datum "d" of the $4^{th}$ scan line and the multi-level datum "e" of the $5^{th}$ scan line are either 0% (when the input binary datum B is 0) or 100% (when the input binary datum B is 1). The multi-level datum "c" of the $3^{rd}$ scan line is either 0% (when both the input binary data A and B are 0), 100% (when both the input binary data A and B are 1), or 50% (when one of the input binary data A and B is 0, and the other is 1).

Figure 20:
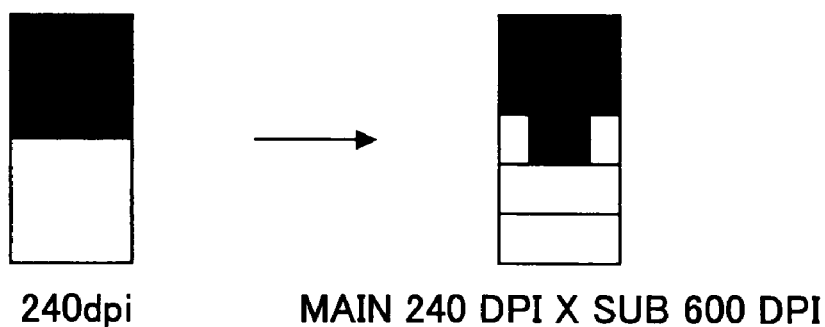
FIG. 20 is a schematic diagram for explaining the data transform from binary image data to pulse width modulation data according to the third embodiment.

FIG. 20 shows an exemplary data transform in which the input binary datum A of the $1^{st}$ scan line is 1 (black), and the input binary datum B of the $2^{nd}$ scan line is 0 (white). The data transform unit 22 transforms the above input binary data into the output multi-level data in which the data "a" and "b" are 100%, the datum "c" is 50%, and the data "d" and "e" are 0%. Since the output multi-level data correspond to PWM duty, the LD 9 is caused to radiate the light beam at a 100% duty (when the output multi-level data is 100%), at a 50% duty (when the output multi-level data is 50%), and is caused to radiate no light beam (when the output multi-level data is 0%).

Figure 21:
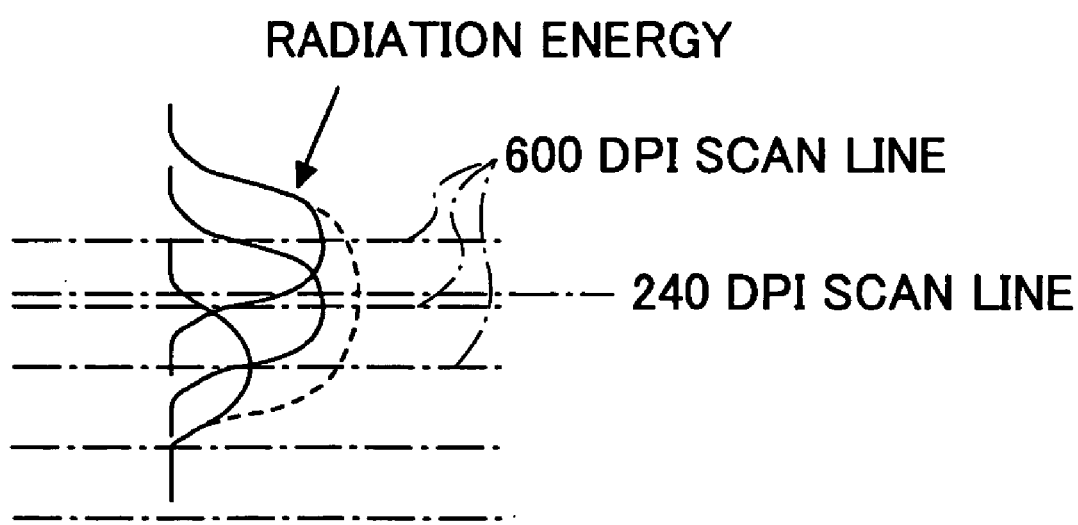
FIG. 21 is a schematic diagram showing the distribution of radiant energy according to the third embodiment.

FIG. 21 is a schematic diagram showing the distribution of radiant energy of the light beams radiated by the LD 9 in accordance with the PWM pattern shown in FIG. 20. A composite light beam in which the light beams corresponding to the output multi-level data "a" through "e" are superposed is shown by a broken line. It is noted that, although the barycenter of the radiant energy distribution of the original light beams radiated by the LD 9 are located on the respective 600 dpi scan lines, the barycenter of the radiant energy distribution of the composite light beam indicated by the broken line is located on the 240 dpi scan line.

More specifically, if the radiant energy of the light beams scanning on one of three 600 dpi scan lines located at an end is about 1/2 times the radiant energy of the light beam scanning on the other ones of the 600 dpi scan lines, the radiant energy of a composite light beam in which the light beam scanning on the three 600 dpi scan lines are superposed has its barycenter on a 240 dpi scan line. The word "about 1/2 times" means that the ratio between the light beams may need to be fine tuned to compensate for the difference in the performance of engines caused by the photosensitive unit 1 and the LD 9. Accordingly, the ratio may range between $(1/2)\pm\alpha$, where $\alpha$ is the compensation factor determined by the fine tuning.

FIGS. 20 and 21 show the case in which the binary image data of the upper scan line is black (1) and that of the lower scan line is white (0). In the case in which the input binary image data of the upper line is white (0) and that of the lower line is black (1), the radiant energy of the light beam scanning on the $3^{rd}$ 600 dpi scan line needs to be about 1/2 times that of the $4^{th}$ and $5^{th}$ 600 dpi scan lines.

Figure 22:
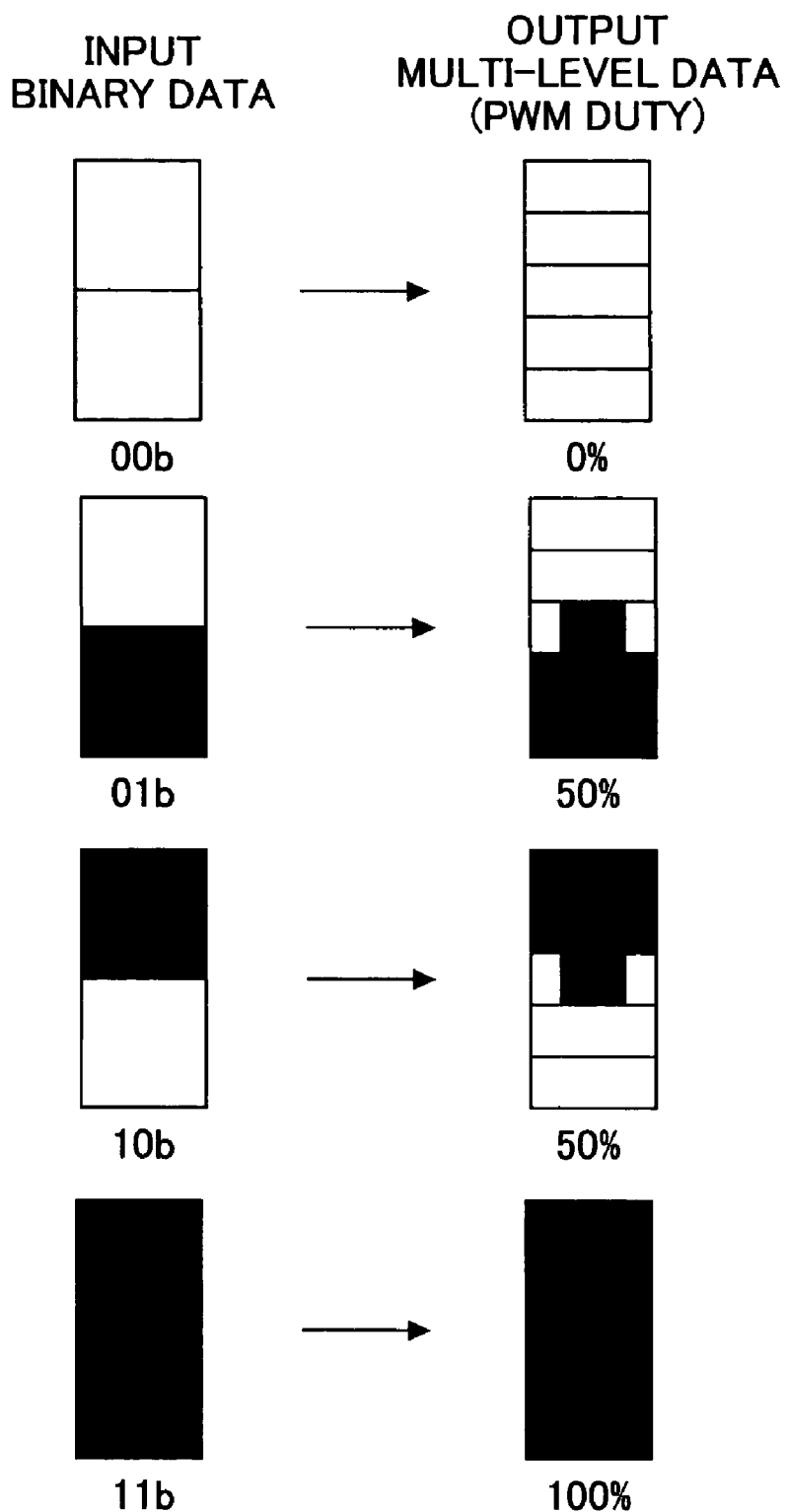
FIG. 22 is a schematic diagram showing the typical patterns of data transform according to the third embodiment.

As described above, the transform unit 22 transforms 2 dots of the binary image data (corresponding to A and B) of 240 dpi input resolution (sub-scan resolution) into 5 dots of multi-level data (corresponding to "a" through "e") of 600 dpi print resolution. FIG. 22 is a schematic diagram showing the above data transform.

When the input data AB=00, all output data (PWM duty) is 0% ("a" through "e"=0). When the input data AB=01 or AB=10, the output multi-level data (PWM duty) is 50% (a=b=0%, d=e=100%, c=50%, or a=b=100%, d=e=0%, c=50%). When the input binary data AB=11, all output multi-level data (PWM duty) is 100% ("a" through "e"=100%).

A data transform table 25 as shown in FIG. 10A may be used for transforming the data. Data (2 bits) of the two lines of 240 dpi and the position information (2 bits) designating one of the five scan lines of 600 dpi are input to the data transform table 25. The data transform table 25 outputs the PWM duty in response to the input.

Only the output multi-level data of the middle scan line (among the five 600 dpi scan lines) may be determined by the data transform table 25 in the following manner.

The multi-level data of the two upper 600 dpi scan lines are the "same" as that of the upper 240 dpi scan line. The multi-level data of the two lower 600 dpi scan lines are the "same" as that of the lower 240 dpi scan line. As described above, the "same" data means that, if the input binary data is 0, the output multi-level data is 0%, and if the input binary data is 1, the output multi-level data is 100%. The multi-level data of the middle 600 dpi scan line are determined based on the input data (2 bits) of the two 400 dpi scan lines. Only the multi-level data of the middle 600 dpi scan line need to be determined by the data transform table 25.

As shown in FIG. 22, when the input data AB are 01 or 10, the multi-level data (PWM duty) of the middle 600 dpi scan line is set at 50%. However, the actual radiant energy of the light beam is not necessarily proportional to the nominal PWM duty due to noise in the PWM pattern. The multi-level data (PWM duty) may need to be adjusted so as to improve the 600 dpi image formed as a result of the above data transform. The data transform table 25 is useful in this case.

The output multi-level data may be computed by the following computation without using the above data transform table 25. The output multi-level data are computed based on the input binary data A and B as follows:

$$a=b=A$$

$$d=e=B$$

$$c=(A+B)/2$$

That is, the five 600 dpi scan lines except for the middle 600 dpi scan line are divided into the upper 600 dpi scan lines and the lower 600 dpi scan lines by the middle 600 dpi scan line. The output multi-level data "a" and "b" of the upper 600 dpi scan lines are the "same" as the input binary data A of the upper 240 dpi scan line. The output multi-level data "d" and "e" of the lower 600 dpi scan lines are the "same" as the input binary data B of the lower 240 dpi scan line. The output multi-level data "c" of the middle 600 dpi scan line is determined based on both the input binary data A and B of the upper and lower, respectively, 240 dpi scan lines.

As described above, a data adjustment table may be provided after the data transform unit for tuning the output multi-level data (PWM data) so as to improve the 600 dpi image formed as a result of the above data transform.

According to the above arrangement, the data transform unit 22 can transform the input binary data of which sub scan resolution is 2/5 times the print resolution into the output multi-level data of the print resolution. The image forming apparatus can print the input image of 240 dpi sub scan resolution as an image of 600 dpi sub scan resolution in accordance with the output multi-level data. The printed image looks like an image of 240 dpi sub scan resolution. The print clock may need to be electrically changed, but the process linear speed and the rotational speed of the polygon motor M, for example, do not need to be mechanically changed.

According to the present embodiment, the pulse width modulation (PWM) method is used to modulate the radiant energy of the light beam radiated by the LD 9. According to another embodiment, the intensity of the light beam may be modulated. Both the pulse width and the intensity may be modulated. The modulation of the intensity and the modulation of both the pulse width and the intensity are known in the art (see Japanese Patent Laid-Open Applications No. 7-266612 and No. 9-163138, for example).

Figure 23:
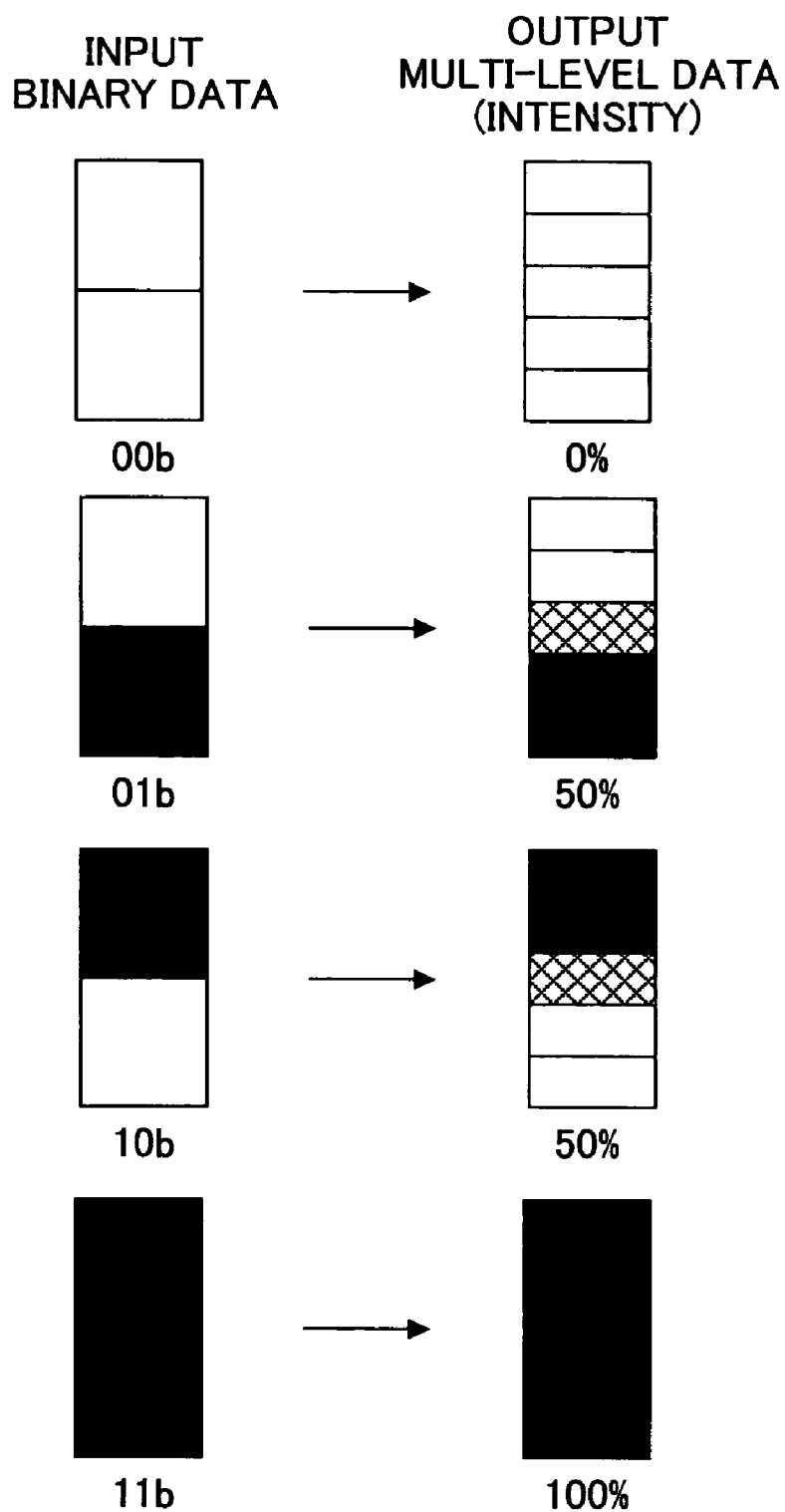
FIG. 23 is a schematic diagram showing the typical patterns of a data transform in which the intensity of light beam is modulated according to the third embodiment.

FIG. 23 is a schematic diagram showing the intensity modulation method. When the input binary data (A, B) are (0, 0), the output multi-level data "a" through "e" are 0%. When the input binary data (A, B) are (0, 1) or (1, 0), the output multi-level data (a, b, c, d, e) are (0%, 0%, 50%, 100%, 100%) or (100%, 100%, 50%, 0%, 0%), respectively. The black portion indicates the output multi-level data of 100%, and the shaded portion indicates the output multi-level data of 50%. When the input binary data (A, B) are (1, 1), the output multi-level data "a" through "e" are 100%.

Since the beam diameter of the light beam radiated by the LD 9 is about 80 μm, the distribution of the radiant energy according to the intensity modulation is similar to that of the pulse width modulation shown in FIG. 21. As a result, it is possible to shift the barycenter of a latent image formed by three light beams having an intensity ratio of 2:2:1 distant from each other by 600 dpi distance (the distance of the print resolution), to the 240 dpi scan line (the input resolution).

As described as the first and the third embodiments of the present invention, the buffer memory 21 buffers input binary data, the sub-scan resolution of which is 2/n (n: an odd integer equal to or greater than 3) times the sub-scan print resolution. The data transform unit 22 transforms the input binary data into output multi-level data of the sub-scan print resolution. The light beam is modulated in accordance with the output multi-level data. The light beams on the adjacent (n+1)/2 scan lines arranged in the sub scan directions are superposed thereby to form a composite dot having its barycenter on the scan line of the input resolution.

The "n" adjacent scan lines arranged in the sub scan direction except for the middle scan line are divided into upper (n−1)/2 scan lines and lower (n−1)/2 scan lines. The output multi-level data of the upper (n−1)/2 scan lines and the output multi-level data of the lower (n−1)/2 scan lines are the "same" as the upper input binary data and the lower input binary data, respectively. The output multi-level data of the middle scan line is determined based on both the upper input binary data and the lower input binary data.

Figure 24:
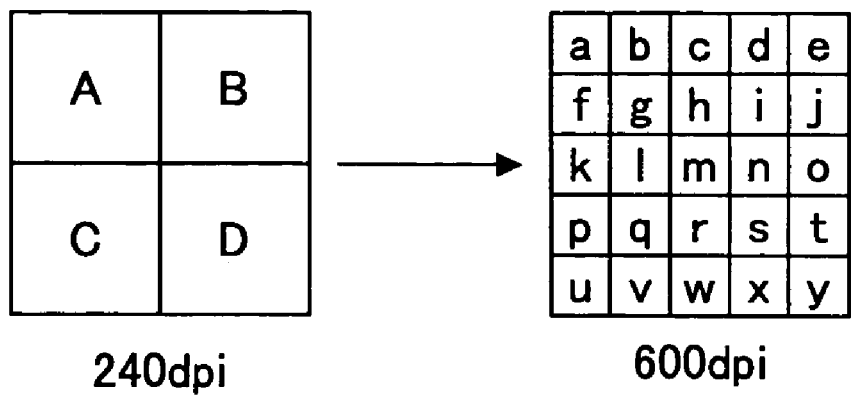
FIG. 24 is a schematic diagram for explaining a data transform according to a fourth embodiment.

An image forming apparatus according to a fourth embodiment is described below with reference to FIGS. 24 through 26. The image forming apparatus according to the fourth embodiment is a laser printer, for example, that can print images of 600 dpi resolution in the main scan directions and the sub scan directions. This laser printer is similar to that according to the second embodiment, but is different in that this laser printer can print 600 dpi images based on input binary data of 240 dpi resolution in the main scan directions and the sub scan directions. Portions that are the same as those of the above embodiments are referred to by the same reference numerals, and their description is omitted. In the third embodiment, it is assumed that the resolution in the main scan directions are adjusted by reducing the print clock down to 240 dpi. In the fourth embodiment, the print clock remains at its original 600 dpi.

The buffer memory 21 operates in almost the same manner as that of the second embodiment except for outputting the same input binary data of two adjacent pixels in the main scan directions for 5 print clock cycles.

The 240 dpi input binary data of two scan lines read simultaneously are input to the data transform unit 22. The data transform unit 22 processes four pixels including 2 adjacent pixels in 2 adjacent scan lines in the 5 print clock cycles.

The data transform performed by the data transform unit 22 is described with reference to FIG. 24. In FIG. 24, a 2×2 matrix of the input binary data of 240 dpi resolution in both the main scan directions and the sub scan directions is shown at the left side of the FIG. 24, and a 5×5 matrix of the output multi-level data of 600 dpi resolution in both the main scan directions and the sub scan directions is shown at the right side of the FIG. 24.

While 5 sub scan lines are printed, only the input binary image data of 2 sub scan lines are processed. The 5×5 matrix of the output multi-level data is divided into 4 sub-matrixes (a, b, f, g), (d, e, i, j), (p, q, u, v), (s, t, x, y) by the middle pixel array "c", "h", "m", "r", "w" and the middle sub scan line "k", "l", "m", "n", "o". All the output multi-level data of each sub-matrix are the same as the corresponding input binary data. That is, $a=b=f=g=A$, $d=e=i=j=B$, $p=q=u=v=C$, and $s=t=x=y=D$.

The output multi-level data of the middle pixel array and the middle scan line are determined in the following manner. For example, the output multi-level data "c" and the output multi-level data "h" are the same, and are determined based on the input binary data A and B. When both A and B are black, the output multi-level data "c" and "h" corresponding to black (100%) are output. When both A and B are white, the output multi-level data "c" and "h" corresponding to white (0%) are output. When one of A and B are white, and the other is black, the output multi-level data "c" and "h" corresponding to medium tone (50%) are output. When the position of the pulse can be adjusted, the pulse may be shifted to the black dot. The output multi-level data "r" and "w" in the middle pixel array are determined in the same manner based on the input binary data C and D.

The output multi-level data "k" and "l" are the same, and are determined based on the input binary data A and C. When the both input binary data A and C are 1, the output multi-level data corresponding to black (100%) are output. When the both input binary data A and C are 0, the output multi-level data corresponding to white (0%) are output. When one of the input binary data A and B is 1, and the other is 0, the output multi-level data corresponding to medium tone (50%) are output. The output multi-level data "m" at the crossing point of the middle pixel array and the middle scan line is determined based on the input binary data A, B, C, and D. If one of the input binary data A, B, C, D is 1, and the others are 0, the output multi-level data is 25%. If two of them are 1, the output multi-level data is 50%. If three of them are 1, the output multi-level data is 75%. If all of them are 1, the output multi-level data is 100%.

Figure 25:
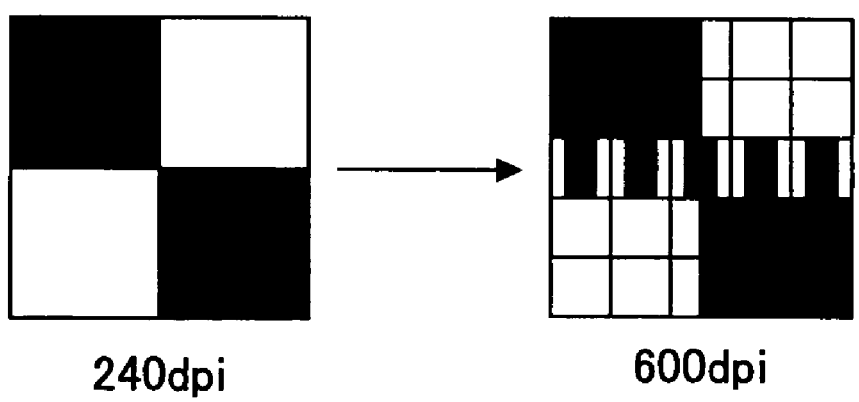
FIG. 25 is a schematic diagram showing the data transformed into pulse width modulation according to the fourth embodiment.

FIG. 25 shows the output multi-level data (PWM data) of 600 dpi resolution in the case where the input binary data A, D are black (1), and B, C are white (0), the input binary data being of 240 dpi resolution. The black portion in FIG. 25 indicates the timing in which the LD 9 is activated. That is, since the input binary data A, D are black (1), the output multi-level data (PWM data) "a", "b", "f", "g", "s", "t", "x", "y" are 100%. Since the input binary data A, B are black (1) and white (0), respectively, the output multi-level data "c", "h" are 50%. Since the input binary data C, D are white (0) and black (1), respectively, the output multi-level data "r", "w" are 50%. Since the input binary data A, C are black (1) and white (0), respectively, the output multi-level data "k", "l" are 50%. Since the input binary data B, D are white (0) and black (1), respectively, the output multi-level data "n", "o" are 50%. The output multi-level data "m" is determined to be 50% based on the input binary data A, B, C, D. It is noted that the pulses of the output multi-level data "c" and "h" are shifted to the left toward the input binary data A that is black (toward the output multi-level data "b" and "g"). The pulses of the output multi-level data "r" and "w" are shifted to the right toward the input binary data D that is black (toward the output multi-level data "s" and "x").

The dot latent images that are formed by activating the LD 9 in accordance with the PWM data as shown in FIG. 25 are similar to those shown in FIG. 14. The superposing of a plurality of light beams of different radiant energy (pulse width) shifts the barycenter of the dot from the pixel array and scan line of 600 dpi resolution to the pixel array and scan line of 240 dpi. Especially, when the pulse width modulation is used, the pulse position of a pixel may be shifted to the left or to the right toward a black (1) pixel that is adjacent to the pixel in the main scan directions. According to the above arrangement, the medium tone pixel is gathered to the black pixel so that the image quality is improved.

As described above, the data transform unit 22 according to this embodiment transforms the 4 dots (2 pixels in the main scan directions×2 scan lines in the sub scan directions) of the input binary data of 240 dpi in both the main scan directions and the sub scan directions into the 25 dots (5 pixels in the main scan directions×5 scan lines in the main scan directions) of the output multi-level data of 600 dpi in both the main scan directions and the sub scan directions.

Figure 26:
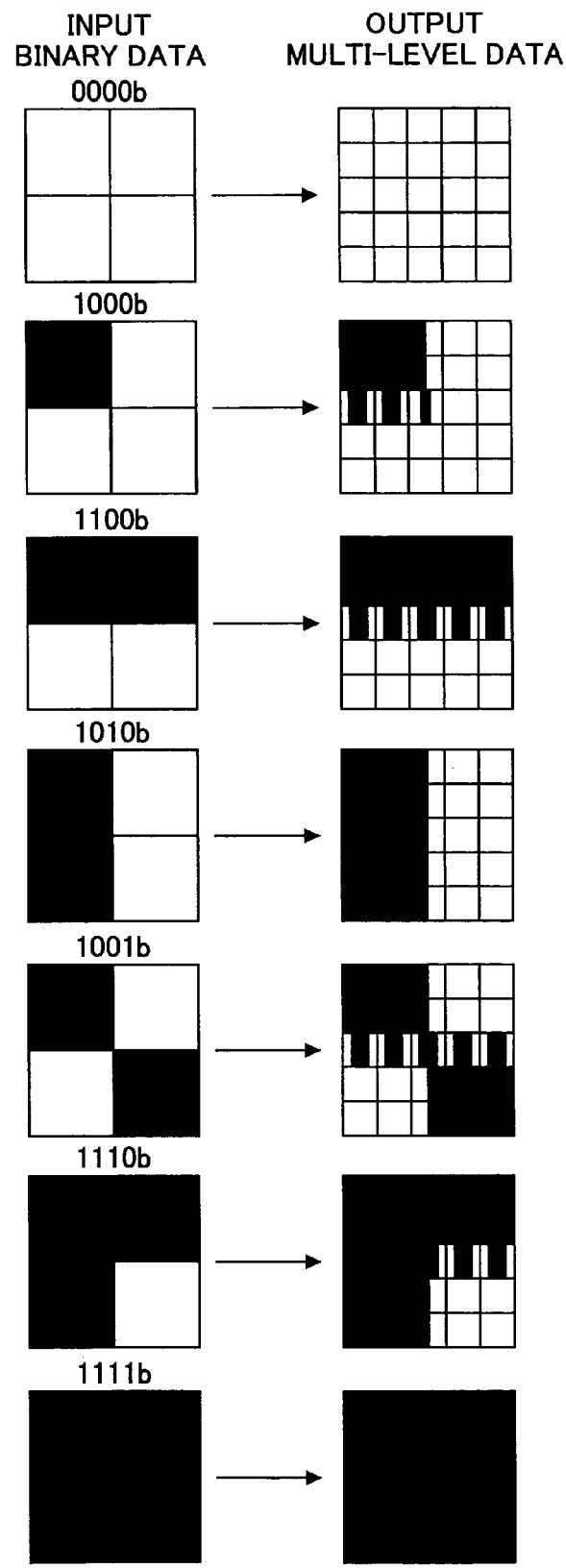
FIG. 26 is a schematic diagram showing the typical patterns of data transform according to the fourth embodiment.

FIG. 26 is a schematic diagram partially showing the data transform.

When the input binary data are ABCD=0000, the PWM duty of the output multi-level data are 0% (a through y=0%).

When the input binary data are ABCD=1000, the PWM duty of the output multi-level data are a=b=f=g=100%, c=h=k=l=50% (c and h are shifted to the left), and m=25%.

When the input binary data are ABCD=1100, the PWM duty of the output multi-level data are a through j=100%, and k through o=50%.

When the input binary data are ABCD=1010, the PWM duty of the output multi-level data are a=b=f=g=k=l=p=q=u=v=100%, and c=h=m=r=w=50% (shifted to the left).

When the input binary data are ABCD=1001, the PWM duty of the output multi-level data are a=b=f=g=s=s=t=x=y=100%, and c=h=m=r=w=k=l=n=o=50% (c and h are shifted to the left, and r and w are shifted to the right).

When the input binary data are ABCD=1110, the PWM duty of the output multi-level data are a through j=k=l=p=q=u=v=100%, o=r=w=50% (r and w are shifted to the left), and m=75%.

When the input binary data are ABCD=1111, the PWM duty of the output multi-level data are a through y=100%.

A data transform table 26 as shown in FIG. 16A may be used for transforming the data. Data (4 bits) of the two pixels (in the main scan directions) times two scan lines and the position information (4 bit) designating one of the 25 pixels in the 5×5 matrix are input to the data transform table 26. The data transform table 26 outputs the PWM duty (output multi-level data) in response to the input.

Alternatively, only the output multi-level data (c, h, m, r, w, k, l, n, o) except for the output multi-level data of sub-matrixes (a, b, f, g), (d, e, i, j), (p, q, u, v), and (s, t, x, y) at the four corners of the 5×5 matrix may be transformed by the data transform table.

The output multi-level data of the elements of sub matrixes at the four corner of the 5×5 matrix of 600 dpi resolution, that is, (a, b, f, g), (d, e, i, j), (p, q, u, v), and (s, t, x, y) are determined based on whether the input binary data A, B, C, and D, respectively, are white (0) or black(1). Specifically, the output multi-level data c, h, r, w are determined based on two pixels at the left and the right of the input binary data (A and B, or C and D). The output multi-level data k, l, n, o are determined based on two pixels at the top and the bottom of the input binary data (A and C, or B and D). The output multi-level data m is determined based on the state of the input binary data A, B, C, and D. Accordingly, before being input to the data transform table, the data may be transformed in the following manner.

For example, the output multi-level data of the 4 sub matrixes at the corner of the 5×5 matrix, that is, (a, b, f, g), (d, e, i, j), (p, q, u, v), and (s, t, x, y) are determined either "00000" (00H) or "11111" (1FH) based on the input binary image data A, B, C, and D. That is, a=b=f=g=A, d=e=i=j=B, p=q=u=v=C, and s=t=x=y=D. The other 9 output multi-level data are converted as follows:

output data c, h[5:0]=(A, B, 0, 0, 0),
output data r, w[5:0]=(C, D, 0, 0, 0),
output data k, l[5:0]=(A, C, 1, 0, 0),
output data n, o[5:0]=(B, D, 1, 0, 0), and
output data m[5:0]=(A, B, C, D, 1).

The lower 3 bits "0, 0, 0", for example, indicate that the higher 2 bits "A, B" are data arranged in a row (main scan directions). The lower 3 bits "1, 0, 0", for example, indicate that the higher 2 bits "A, C" are data arranged in a column (sub scan directions). The 5 bit data described above are transformed by the data transform table into the PWM signal.

The output multi-level data may be computed in the following manner without using the data transform table 26.

The output multi-level data (a, b, f, g), (d, e, i, j), (p, q, u, v), and (s, t, x, y) at the four corners of the 5×5 matrix are determined to be the "same" value, either white (0%) or black (100%), as the input data A through D. That is, for example, if the input binary data A is 0, the output multi-level data a=b=f=g=0%. If the input binary data A is 1, the output multi-level data a=b=f=g=100%.

The remaining 9 output multi-level data are determined as follows:

$$c=h=(2A+2B)/4,$$

$$k=l=(2A+2C)/4,$$

$$m=(A+B+C+D)/4,$$

$$n=o=(2B+2D)/4, \text{ and}$$

$$r=w=(2C+2D)/4.$$

The phase data indicating the position of PWM pulse are computed as follows:
c=h=B−A,
r=w=D−C, and
m=B+D−(A+C).

If the result of the phase data computation is either −1 or −2, the PWM pulse is shifted to the left. If the result of the phase data computation is 0, the PWM pulse is positioned in the middle. If the result of the phase data computation is either +1 or +2, the PWM pulse is shifted to the right.

In the 5×5 matrix of the output multi-level data formed by the adjacent 5 pixels in the adjacent 5 scan lines, the output multi-level data in sub-matrixes, that is, (a, b, f, g), (d, e, i, j), (p, q, u, v), (s, t, x, y), obtained by dividing the 5×5 matrix with the middle pixel array c, h, m, r, w and the middle scan line k, l, m, n, o are determined to be the "same" data as the input binary data A, B, C, D, respectively, of the 2×2 matrix.

The output multi-level data (c, h) and (r, w) of the middle pixel array are determined based on the input binary data (A, B) and (C, D), respectively. The output multi-level data (k, l) and (n, o) of the middle scan line are determined based on the input binary data (A, C) and (C, D), respectively, of the 2×2 matrix. The output multi-level data m at the crossing point of the middle pixel array and the middle scan line is determined based on the input binary data A, B, C, D of the 2×2 matrix.

As described above, the data adjustment table may be provided between the data transform unit 22 and the PWM controller 23, and the output multi-level data may be adjusted thereby before input to the PWM controller so as to improve the image formed as the result of the data transform.

Accordingly, the data transform unit 22 can transform the input binary data of which resolution is 240 dpi both in the main scan directions and the sub scan directions, the resolution being 2/5 times the print resolution of 600 dpi, into the output multi-level data of which resolution is 600 dpi both in the main scan directions and the sub scan directions. The PWM controller 23 modulates the pulse width of the light beam radiated by the LD 9 based on the output multi-level data. In response to receipt of the input binary data, the laser printer according to the fourth embodiment can print an image of which resolution is 600 dpi both in the main scan directions and in the sub scan directions without changing its print resolution. The 600 dpi image of the input binary data looks as if the 600 dpi image is an image of which resolution is 240 dpi both in the main scan directions and in the sub scan directions. It is not necessary to electronically or mechanically change the print clock, the process linear speed, and/or the rotational speed of the polygon motor.

The laser printer according to the fourth embodiment uses the pulse width modulation (PWM) for modulating the radiant energy of the light beam radiated by the LD 9. According to another embodiment, the laser printer may modulate the intensity of the light beam, or both the pulse width and the intensity of the light beam. The modulation methods of the intensity of the light beam or both the pulse width and the intensity of the light beam are publicly known (see Japanese Patent Laid-Open Applications No. 7-266612 and No. 9-163138, for example).

As is apparent from the second embodiment and the fourth embodiment, the image forming apparatus according to an aspect of the present invention can buffer the input binary data of a resolution 2/n times (n: an odd integer equal to or greater than 3) the print resolution, in both the main scan directions and the sub scan directions, with the buffer memory 21; transform the input binary data into the output multi-level data of the print resolution in both the main scan directions and the sub scan directions with the data transform unit 22; and modulate the light beam radiated by the LD 9 in accordance with the output multi-level data with the PWM controller 23.

In the data transformation performed by the data transform unit 22, a "n×n" matrix is divided, by the middle pixel array in the sub scan directions and the middle scan line in the main scan directions, into the crossing point of the middle pixel array and the middle scan line, a middle pixel array except for the crossing point, a middle scan line except for the crossing point, and 4 sub-matrixes each sub-matrixes having "(n−1)/2×(n−1)/2" pixels (light beams).

The output multi-level data of the upper left sub-matrix, for example, are determined to be the "same" as the upper left pixel of the input binary data. The output multi-level data of the upper half of the middle pixel array except for the crossing point are determined based on the upper pixels of the input binary data, and the output multi-level data of the lower half of the middle pixel array except for the crossing point are determined based on the lower pixels of the input binary data. The output multi-level data of the left half of the middle scan line except for the crossing point are determined based on the left pixels of the input binary data, and the output multi-level data of the right half of the middle scan line except for the crossing point are determined based on the right pixels of the input binary data. The output multi-level data of the crossing point is determined based on all pixels of the input binary data.

According to the above embodiments, the data transform unit 22 is provided in the image write controller. According to another embodiment, the function of the data transform unit 22 may be realized by a controller controlled by a computer program. The output multi-level data generated by the controller may be output to the LD driver via an interface for handling the multi-level data.

According to the above embodiments, the raster scanning type laser printers are described above as the image forming apparatus according to the present invention. However, the image forming apparatus according to the present invention is not limited to the raster scanning type laser printers. According to another embodiment, the image forming apparatus according to the present invention may be a solid-state scanning type such as a LED printer shown in FIG. 27.

Figure 27:
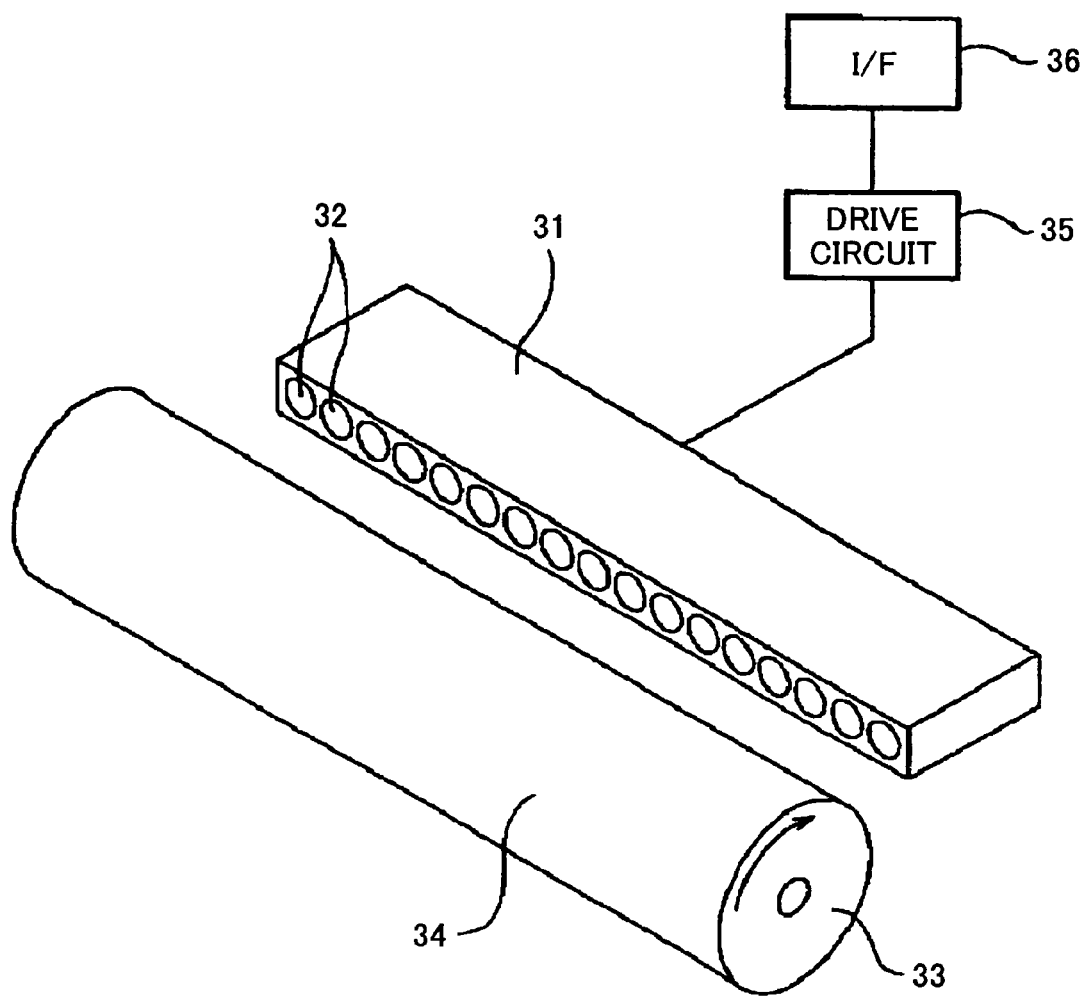
FIG. 27 is a schematic diagram showing an LED printer according to a variation of an image forming apparatus according to the present invention.

As shown in FIG. 27, an LED array head 31 (a solid-state scanning device) in which a number of LED 32 (light emitting elements) are arranged in the main scan directions is provided opposite a rotating drum-shaped photosensitive unit 33. Each LED 32 of the LED array head 31 emits a light beam, and forms a spot on a surface 34 of the photosensitive unit 33 that can move in the sub scan directions. The LED printer, which is based on the electrophotography process, includes a charging unit, a development unit, a transfer charger, for example, facing the surface 34 of the photosensitive unit 33. Paper is transported between the transfer charger and the photosensitive unit 33 through a paper transportation path.

A drive circuit 35 for driving each LED 32 is connected to the LED array head 31. The image data are input to an interface (I/F) 36 connected to the drive circuit 35.

If the LEDs 32 are arranged at a 600 dpi resolution, the LED printer is a 600 dpi printer. The radiant energy of each LED 32 is controllable by modulating the pulse width and the intensity thereof (See Japanese Patent Laid-Open Application No. 8-20129, for example). It is apparent that, if the input image of 400 dpi or 240 dpi resolution is input, the second and fourth embodiments are applicable to the LED printer.

A description of a fifth embodiment of the present invention is given below with reference to FIGS. 28 and 29. An image forming apparatus according to the fifth embodiment is a multi-beam laser printer that can print images of 600 dpi resolution in both the main scan directions and the sub scan directions. The multi-beam laser printer according to the fifth embodiment is assumed to include two laser diodes that each emit a light beam. The light beams emitted by the two laser diodes are referred to as a first light beam and a second light beam in the following description. The image forming apparatus according to the fifth embodiment scans the photosensitive unit with two light beams so that it can print images faster than the single-beam laser printer according to the above embodiments does. The structure of the multi-beam laser printer is known in the art, and therefore, no description is given here.

The present invention is applicable to the modulation of each laser beam of the multi-beam laser printer. FIG. 28 is a schematic diagram showing the data transform from the input binary data of 400 dpi resolution in the sub scan directions to the output multi-level data of 600 dpi resolution in the sub scan directions. The input binary data A1 and B1 are transformed into the output multi-level data a1, c1, and b1 in the same manner as the first embodiment. The input binary data A2 and B2 are transformed into the output multi-level data a2, c2, and b2 as well.

In the case of the single-beam laser printer according to the first embodiment, as described above, a single light beam is modulated in accordance with the multi-level data a1, c1, b1, a2, c2, b2 in this order, and a latent image is formed on the photosensitive unit 1. On the other hand, in the case of the multi-beam laser printer according to the fifth embodiment, the output multi-level data a1 and c1 modulates the first light beam and the second light beam, respectively. The first light beam and the second light beam scan the photosensitive unit 1 independently and simultaneously, and form a single latent image. The next output multi-level data b1 and a2 modulate the first light beam and the second light beam, respectively. The first light beam and the second light beam scan the photosensitive unit 1 independently and simultaneously. Then, the next output multi-level data c2 and b2 modulate the first light beam and the second light beam, respectively. The first light beam and the second light beam scan the photosensitive unit 1 independently and simultaneously.

The multi-beam laser printer is different from the single-beam laser printer according to the first embodiment in that the two light beams are modulated in accordance with the output multi-level data.

FIG. 29 is a schematic diagram showing the data transform from the input binary data of 400 dpi resolution in both the main scan directions and the sub scan directions to the output multi-level data of 600 dpi resolution in both the main scan directions and the sub scan directions.

The input binary data A1, B1, C1, D1 are transformed into the output multi-level data a1 through i1 in the same manner as the second embodiment. The input binary data A2, B2, C2, D2 adjacent to the input binary data A1, B1, C1, D1 in the sub scan directions are transformed into the output multi-level data a2 through i2 as well.

In the case of the single-beam laser printer according to the second embodiment, as described above, a single light beam is modulated in accordance with the multi-level data a1, e1, b1, f1, g1, h1, c1, i1, d1, a2, e2, b2, f2, g2, h2, c2, i2, d2 in this order, and a latent image is formed on the photosensitive unit 1.

On the other hand, in the case of the multi-beam laser printer according to the fifth embodiment, the output multi-level data a1 and f1 modulate the first light beam and the second light beam, respectively. The output multi-level data e1 and g1 modulate the first light beam and the second light beam, respectively. The output multi-level data b1 and h1 modulate the first light beam and the second light beam, respectively. The output multi-level data c1 and a2 modulate the first light beam and the second light beam, respectively. The output multi-level data i1 and e2 modulate the first light beam and the second light beam, respectively. The output multi-level data d1 and b2 modulate the first light beam and the second light beam, respectively. The output multi-level data f2 and c2 modulate the first light beam and the second light beam, respectively. The output multi-level data g2 and i2 modulate the first light beam and the second light beam, respectively. The output multi-level data h2 and d2 modulate the first light beam and the second light beam, respectively. The first light beam and the second light beam modulated as above scan the photosensitive unit 1 independently and simultaneously, and form a single latent image.

The multi-beam laser printer is different from the single-beam laser printer according to the first embodiment in that the two light beams are modulated in accordance with the output multi-level data.

The present invention is not limited to these embodiments, and variations and modifications may be made without departing from the scope of the present invention.

This patent application is based on Japanese Priority Patent Applications No. 2002-350820 filed on Dec. 3, 2002, and No. 2003-403255 filed on Dec. 2, 2003, the entire contents of which are hereby incorporated by reference.

What is claimed is:

1. An image forming apparatus, comprising:
  a data buffer unit configured to buffer input binary data, a sub-scan resolution of which is 2/n (n: an odd integer greater than or equal to 3) times a sub-scan print resolution;

a data transform unit configured to transform the input binary data of 2 input scan lines into output multi-level data of n output scan lines of the sub-scan print resolution; and a light beam modulation unit configured to modulate radiant energy of a light beam in accordance with the output multi-level data, wherein the data transform unit sets the output multi-level data of upper (n−1)/2 output scan lines equal to the input binary data of an upper input scan line, the output multi-level data of lower (n−1)/2 output scan lines equal to the input binary data of a lower input scan line, and the output multi-level data of a middle output scan line based on the input binary data of the upper input scan line and the input binary data of the lower input scan line.

2. The image forming apparatus as claimed in claim 1, wherein said light beam modulation unit forms a dot, a barycenter of which lies on a scan line corresponding to the sub-scan resolution of the input binary data, by superposing light beams lying on adjacent (n+1)/2 scan lines corresponding to the sub-scan print resolution.

3. The image forming apparatus as claimed in claim 2, wherein said light beam modulation unit adjusts the radiant energy of the light beam lying on one of the adjacent (n+1)/2 scan lines on one end, to substantially 1/2 times the radiant energy of the light beams lying on other scan lines.

4. The image forming apparatus as claimed in claim 1, wherein said light beam modulation unit forms 2 dots, each having a barycenter lying on one of 2 scan lines corresponding to the sub-scan resolution of the input binary data, by selectively superposing light beams on n adjacent scan lines separated at a distance corresponding to the sub-scan print resolution.

5. The image forming apparatus as claimed in claim 1, wherein said data transform unit comprises a data transform table that relates the input binary data of 2 input scan lines to the output multi-level data of n output scan lines.

6. The image forming apparatus as claimed in claim 1, wherein said data buffer unit buffers the input binary data, the sub-scan resolution and a main-scan resolution of which are 2/n (n: an odd integer greater than or equal to 3) times the sub-scan print resolution and a main-scan print resolution, respectively; and said data transform unit transforms the input binary data into the output multi-level data of the sub-scan print resolution and the main-scan print resolution.

7. The image forming apparatus as claimed in claim 6, wherein said data transform unit transforms the input binary image data of a 2×2 matrix corresponding to 2 pixels in the main scan directions and 2 input scan lines into the output multi-level data of a n×n matrix corresponding to n pixels in the main scan directions and n output scan lines.

8. The image forming apparatus as claimed in claim 7, wherein said data transform unit comprises a data transform table that relates the input binary data of a 2×2 matrix corresponding to 2 pixels in the main scan directions and 2 input scan lines into the output multi-level data of the n×n matrix corresponding to n pixels in the main scan directions and n output scan lines.

9. The image forming apparatus as claimed in claim 6, further comprising:

a solid-state scanning unit in which a plurality of light sources is arranged in the main scan directions for forming an image by a solid-state scanning method.

10. The image forming apparatus as claimed in claim 1, further comprising:

a light source that radiates a light beam; and a deflection unit that deflects the light beam radiated by said light source; wherein the image forming apparatus forms an image by a raster scanning method.

11. The image forming apparatus as claimed in claim 10, wherein said light beam modulation unit modulates one of the pulse width of the light beam, the intensity of the light beam, and both.

12. An image forming apparatus comprising:

a data buffer unit configured to buffer input binary data, a sub-scan resolution and a main-scan resolution of which are 2/n (n: an odd integer greater than or equal to 3) times a sub-scan print resolution and a main-scan print resolution, respectively;

a data transform unit configured to transform the input binary data into output multi-level data of the sub-scan print resolution and the main-scan print resolution; and a light beam modulation unit configured to modulate radiant energy of a light beam in accordance with the output multi-level data, wherein the data transform unit transforms the input binary image data of a 2×2 matrix corresponding to 2 pixels in main scan directions and 2 input scan lines into the output multi-level data of a n×n matrix corresponding to n pixels in the main scan directions and n output scan lines, said data transform unit divides the n×n matrix with a middle pixel array and a middle scan line into four (n−1)/2×(n−1)/2 sub-matrixes, and determines the output multi-level data of the four (n−1)/2×(n−1)/2 sub-matrixes based on a corresponding respective input binary data, the output multi-level data of upper (n−1)/2 items and the output multi-level data of lower (n−1)/2 items in the middle pixel array are based on 2 upper items and 2 lower items, respectively, in the 2×2 matrix, the output multi-level data of left (n−1)/2 items and the output multi-level data of right (n−1)/2 items in the middle scan line are based on 2 left items and 2 right items, respectively, in the 2×2 matrix, and the output multi-level data of a cross point of the middle pixel array and the middle scan line are based on 4 items in the 2×2 matrix.

13. The image forming apparatus as claimed in claim 12, wherein the data transform unit, when determining the output multi-level data of the middle pixel array based on the 2×2 matrix, shifts the phase of the output multi-level data so that a pulse of the light beam is shifted in the main scan directions toward a pixel that is turned on.

14. An image forming apparatus, comprising:

a data buffer unit configured to buffer input binary data, a sub-scan resolution of which is 2/n (n: an odd integer equal to or greater than 3) times a sub-scan print resolution;

a data transform unit configured to transform the input binary data of 2 input scan lines into output multi-level data of n output scan lines of the sub-scan print resolution;

a plurality of light sources configured to radiate light beams for scanning a photosensitive unit; and a plurality of light beam modulation units each configured to modulate radiant energy of the light beam radiated by one of said light sources, wherein the data transform unit sets the output multi-level data of upper (n−1)/2 output scan lines equal to the input binary data of an upper input scan line, the output multi-level data of lower (n−1)/2 output scan lines equal to the input binary data of a lower input scan line, and the output multi-level data of a middle output scan line based on the input binary data of the upper input scan line and the input binary data of the lower input scan line.

15. An image forming apparatus, comprising:

means for buffering input binary data, a sub-scan resolution of which is 2/n (n: an odd integer equal to or greater than 3) times a sub-scan print resolution;

means for transforming the input binary data of 2 input scan lines into output multi-level data of n output scan lines of the sub-scan print resolution; and means for modulating radiant energy of a light beam in accordance with the output multi-level data, wherein the means for transforming sets the output multi-level data of upper (n−1)/2 output scan lines equal to the input binary data of an upper input scan line, the output multi-level data of lower (n−1)/2 output scan lines equal to the input binary data of a lower input scan line, and the output multi-level data of a middle output scan line based on the input binary data of the upper input scan line and the input binary data of the lower input scan line.

16. The image forming apparatus as claimed in claim 15, wherein said means for modulating the radiant energy of the light beam forms a dot, a barycenter of which lies on a scan line corresponding to the sub-scan resolution of the input binary data, by superposing light beams lying on adjacent (n+1)/2 scan lines corresponding to the sub-scan print resolution.

17. The image forming apparatus as claimed in claim 16, wherein said means for modulating the radiant energy of the light beam adjusts the radiant energy of the light beam lying on one of the adjacent (n+1)/2 scan lines on one end, to substantially 1/2 times the radiant energy of the light beams lying on other scan lines.

18. The image forming apparatus as claimed in claim 15, wherein said means for modulating the radiant energy of the light beam forms 2 dots, each having a barycenter lying on one of 2 scan lines corresponding to the sub-scan resolution of the binary image data, by selectively superposing light beams on n adjacent scan lines separated at a distance corresponding to the sub-scan print resolution.

19. A method of forming an image for an image forming apparatus, comprising:

buffering input binary data, a sub-scan resolution of which is 2/n (n: an odd integer equal to or greater than 3) times a sub-scan print resolution;

transforming the input binary data of 2 input scan lines into output multi-level data of n output scan lines of the sub-scan print resolution;

modulating radiant energy of a light beam in accordance with the output multi-level data; and superposing the light beam on a scan line with the light beam on a adjacent scan line thereby to form a composite light beam, a barycenter thereof being on a scan line of 2/n times the sub-scan print resolution, wherein in the transforming, the output multi-level data of upper (n−1)/2 output scan lines are set equal to the input binary data of an upper input scan line, the output multi-level data of lower (n−1)/2 output scan lines are set equal to the input binary data of a lower input scan line, and the output multi-level data of a middle output scan line are set based on the input binary data of the upper input scan line and the input binary data of the lower input scan line.

20. The image forming apparatus as claimed in claim 19, wherein the input binary data are transformed into the output multi-level data of the sub-scan print resolution with a data transform table.

21. The method as claimed in claim 19, wherein, in the buffering, the sub-scan resolution and a main-scan resolution of the input binary data are 2/n (n: an odd integer equal to or greater than 3) times the sub-scan print resolution and a main-scan print resolution, respectively; and in the transforming, the input binary data are transformed into the output multi-level data of the sub-scan print resolution and the main-scan print resolution.

22. The method as claimed in claim 21, wherein in the transforming the, the input binary data of a 2×2 matrix corresponding to 2 pixels in main scan directions and 2 input scan lines are transformed into the output multi-level data of a n×n matrix corresponding to n pixels in the main scan directions and n output scan lines.

23. The method as claimed in claim 22, wherein in the transforming, a data transform table is used that relates the input binary data of the 2×2 matrix corresponding to 2 pixels in the main scan directions and 2 input scan lines to the output multi-level data of the n×n matrix corresponding to n pixels in the main scan directions and n output scan lines.

24. A method of forming an image for an image forming apparatus, comprising:

buffering input binary data, a sub-scan resolution and a main-scan resolution of which is 2/n (n: an odd integer equal to or greater than 3) times a sub-scan print resolution and a main-scan print resolution;

transforming the input binary data of 2 scan lines into output multi-level data of n output scan lines of the sub-scan print resolution the main-scan print resolution;

modulating radiant energy of a light beam in accordance with the output multi-level data; and superposing the light beam on a scan line with the light beam on a adjacent scan line thereby to form a composite light beam, a barycenter thereof being on a scan line of 2/n times the sub-scan print resolution, wherein, in the transforming the input binary data of a 2×2 matrix corresponding to 2 pixels in main scan directions and 2 input scan lines are transformed into the output multi-level data of a n×n matrix corresponding to n pixels in the main scan directions and n output scan lines, the n×n matrix with a middle pixel array and a middle scan line is divided into four (n−1)/2×(n−1)/2 sub-matrixes, the output multi-level data of the four (n−1)/2×(n−1)/2 sub-matrixes are determined based on the corresponding respective input binary data, the output multi-level data of upper (n−1)/2 items and the output multi-level data of lower (n−1)/2 items in the middle pixel array are determined based on 2 upper items and 2 lower items, respectively, in the 2×2 matrix, the output multi-level data of left (n−1)/2 items and the output multi-level data of right (n−1)/2 items in the middle scan line are determined based on 2 left items and 2 right items, respectively, in the 2×2 matrix, and the output multi-level data of a cross point of the middle pixel array and the middle scan line are determined based on 4 items in the 2×2 matrix.

25. The method as claimed in claim 24, wherein,
in the transforming, when the output multi-level data of the middle pixel array based on the 2×2 matrix are determined,
a phase of the output multi-level data is shifted so that a pulse of the light beam is shifted in the main scan directions toward a pixel that is turned on.

26. An image resolution conversion circuit for an image forming apparatus, comprising:
a data buffer unit configured to buffer input binary data, a sub-scan resolution of which is 2/n (n: an odd integer equal to or greater than 3) times a sub-scan print resolution;
a data transform unit configured to transform the input binary data of 2 input scan lines into output multi-level data of n output scan lines of the sub-scan print resolution; and
a light beam modulation unit configured to modulate radiant energy of a light beam in accordance with the output multi-level data, wherein
the data transform unit sets the output multi-level data of upper (n−1)/2 output scan lines equal to the input binary data of an upper input scan line, the output multi-level data of lower (n−1)/2 output scan lines equal to the input binary data of a lower input scan line, and the output multi-level data of a middle output scan line based on the input binary data of the upper input scan line and the input binary data of the lower input scan line.

27. The image resolution conversion circuit as claimed in claim 26, wherein
said data transform unit comprises a data transform table that relates the input binary data of 2 input scan lines to the output multi-level data of n output scan lines.

28. The image resolution conversion circuit as claimed in claim 26, wherein
said data buffer unit buffers the input binary data, the sub-scan resolution and a main-scan resolution of which are 2/n (n: an odd integer equal to or greater than 3) times the sub-scan print resolution and a main-scan print resolution, respectively; and
said data transform unit transforms the input binary data into the output multi-level data of the sub-scan print resolution and the main-scan print resolution.

29. The image resolution conversion circuit as claimed in claim 28, wherein
said data transform unit transforms the input binary image data of a 2×2 matrix corresponding to 2 pixels in the main scan directions and 2 input scan lines into the output multi-level data of n×n matrix corresponding to n pixels in the main scan directions and n output scan lines.

30. The image resolution conversion circuit as claimed in claim 29, wherein
said data transform unit comprises a data transform table that relates the input binary data of a 2×2 matrix corresponding to 2 pixels in the main scan directions and 2 input scan lines to the output multi-level data of the n×n matrix corresponding to n pixels in the main scan directions and n output scan lines.

31. An image resolution conversion circuit, comprising:
a data buffer unit configured to buffer input binary data, a sub-scan resolution and a main-scan resolution of which are 2/n (n: an odd integer greater than or equal to 3) times a sub-scan print resolution and a main-scan print resolution, respectively;
a data transform unit configured to transform the input binary data into output multi-level data of the sub-scan print resolution and the main-scan print resolution; and
a light beam modulation unit configured to modulate radiant energy of a light beam in accordance with the output multi-level data, wherein
the data transform unit transforms the input binary data of a 2×2 matrix corresponding to 2 pixels in main scan directions and 2 input scan lines into the output multi-level data of a n×n matrix corresponding to n pixels in the main scan directions and n output scan lines,
said data transform unit divides the n×n matrix with a middle pixel array and a middle scan line into four (n−1)/2×(n−1)/2 sub-matrixes, and determines the output multi-level data of the four (n−1)/2×(n−1)/2 sub-matrixes based on a corresponding respective input binary data,
the output multi-level data of upper (n−1)/2 items and the output multi-level data of lower (n−1)/2 items in the middle pixel array are based on 2 upper items and 2 lower items, respectively, in the 2×2 matrix,
the output multi-level data of left (n−1)/2 items and the output multi-level data of right (n−1)/2 items in the middle scan line are based on 2 left items and 2 right items, respectively, in the 2×2 matrix, and the output multi-level data of a cross point of the middle pixel array and the middle scan line are based on 4 items in the 2×2 matrix.

32. The image resolution conversion circuit as claimed in claim 31,
wherein the data transform unit, when determining the output multi-level data of the middle pixel array based on the 2×2 matrix, shifts the phase of the output multi-level data so that a pulse of the light beam is shifted in the main scan directions toward a pixel that is turned on.

* * * * *